United States Patent [19]

MacTribble

[11] Patent Number: 4,489,488
[45] Date of Patent: Dec. 25, 1984

[54] METHODS OF AND APPARATUS FOR ASSEMBLING AN ARTICLE INTO A HOUSING

[75] Inventor: Robert MacTribble, Winston-Salem, N.C.

[73] Assignee: AT&T Technologies, Inc., New York, N.Y.

[21] Appl. No.: 367,842

[22] Filed: Apr. 13, 1982

[51] Int. Cl.³ .................. H01R 43/04; B23P 19/00
[52] U.S. Cl. ............................... 29/881; 29/759; 414/80
[58] Field of Search ............... 29/714, 759, 874, 760, 29/747, 809; 200/6 B, 16 F, 284, 16 D, 116 R; 414/80

[56] References Cited

U.S. PATENT DOCUMENTS

| | | |
|---|---|---|
| 2,846,832 | 8/1958 | Larsen et al. |
| 3,023,493 | 3/1962 | Mittermaier ............... 29/809 X |
| 3,054,237 | 9/1962 | Barkstrom . |
| 3,139,673 | 7/1964 | Zdanis ..................... 29/759 X |
| 3,423,814 | 1/1969 | Davis ...................... 29/714 X |
| 3,437,772 | 4/1969 | Piber ...................... 29/874 X |
| 3,447,695 | 6/1969 | Krepp et al. .............. 414/80 X |
| 4,086,547 | 4/1978 | Nance et al. ............. 200/16 F X |
| 4,086,548 | 4/1978 | Robbins et al. .......... 200/6 B X |
| 4,395,028 | 7/1983 | Kent ....................... 29/760 X |

Primary Examiner—Howard N. Goldberg
Assistant Examiner—Carl J. Arbes
Attorney, Agent, or Firm—D. D. Bosben

[57] ABSTRACT

A substrate-lead subassembly (34S), having relatively fragile lead retaining hooks (68) which project from opposite sides of the subassembly outward beyond the edges of an opening (38) in a housing (36) of a housing subassembly (32) in which the hooks are to be received, is partially assembled into the housing in an initial assembling station (80). More specifically, as the housing subassembly (32) is advanced horizontally into the initial assembling station (80) above the substrate-lead subassembly (34S), opposite sides of the housing (36) are released in sequence so that the housing subassembly drops by gravity through a series of controlled tipping and downward vertical movements to receive the lead-retaining hooks (68) on one side of the substrate-lead subassembly (34S) in the housing with outer ends (70) of the hooks in seated interlocking engagement with an inner support ledge (52) of the housing. Assembly of the substrate-lead subassembly (34S) into the housing (36), including seating of the lead-retaining hooks (68) on the opposite side of the substrate-lead subassembly (34S) on another inner support ledge (52) of the housing, is accomplished in subsequent seating stations (82 and 84). Severing of leads (56) of the substrate-lead subassembly (34S) from connector strap portions (74) and support rails (76), is accomplished in sequential shearing stations (86), to produce a completed attenuator assembly (30). The attenuator assembly (30) then is loaded in a tubular magazine (88) in a magazine loading station (90) which includes an automatic magazine feeding mechanism (342).

27 Claims, 27 Drawing Figures

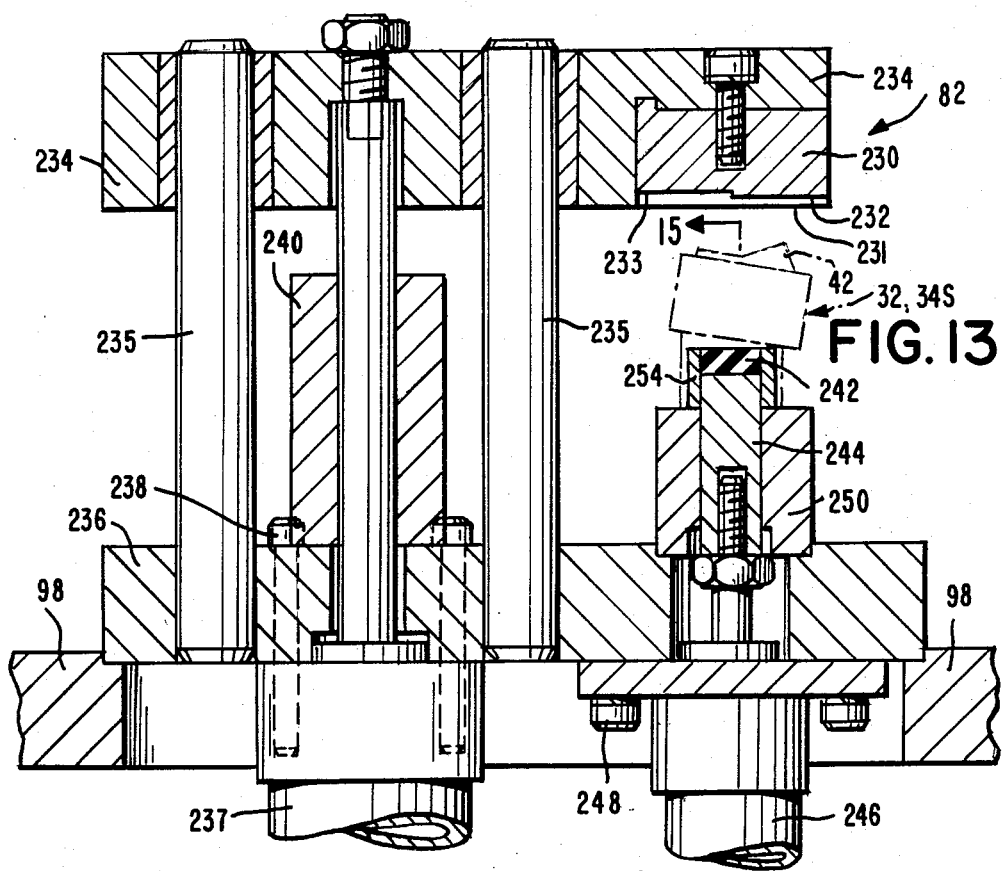

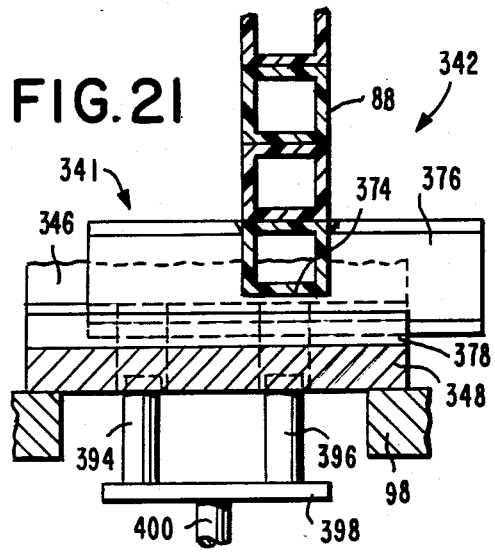
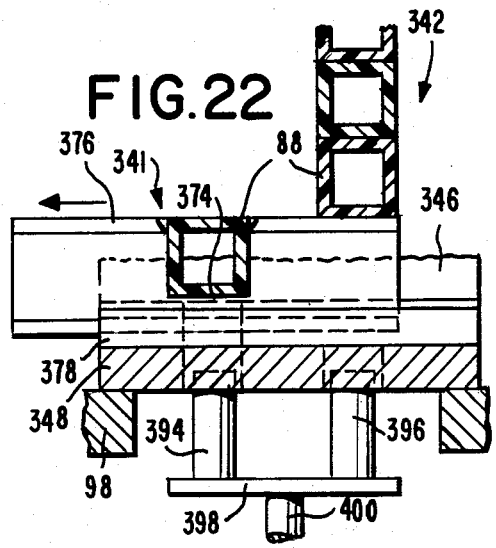
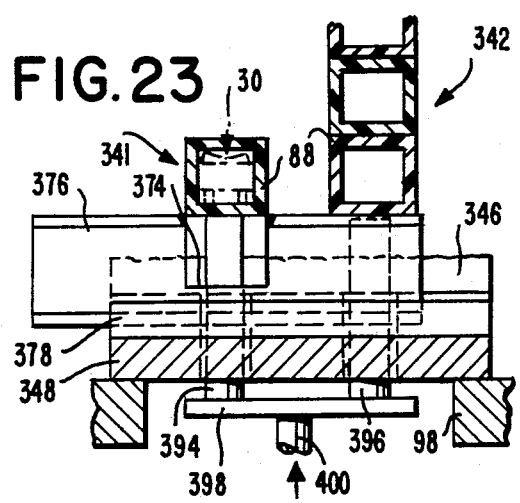
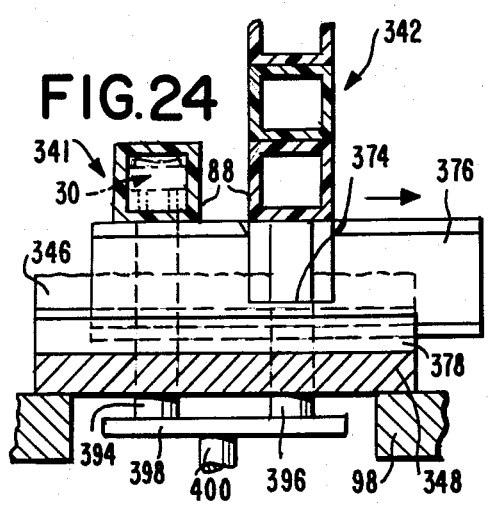
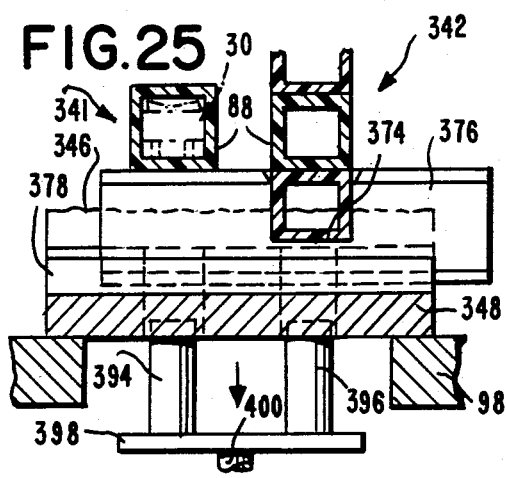
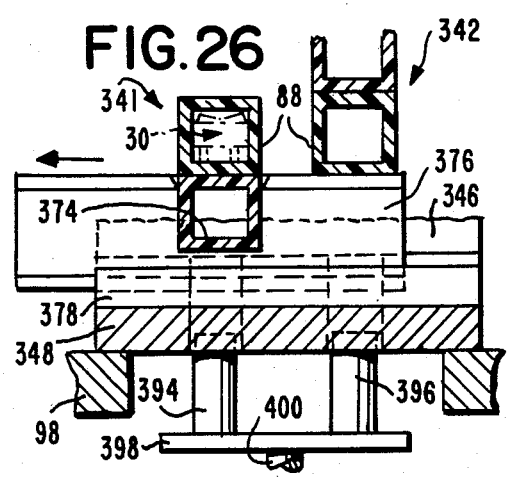

4,489,488

METHODS OF AND APPARATUS FOR ASSEMBLING AN ARTICLE INTO A HOUSING

TECHNICAL FIELD

This invention relates to methods of and apparatus for assembling an article into a housing, and more particularly to methods of and apparatus for assembling an article into a housing in which portions of the article on opposite sides thereof and which are readily susceptible to damage project outward beyond edges of an opening in the housing for receiving the article.

BACKGROUND OF THE INVENTION

U.S. Pat. No. 4,086,548, which issued to T. W. Robbins and R. O. Terry, Jr. on Apr. 25, 1978, discloses a switchable attenuator assembly which includes a housing having a rocker arm support member mounted in the housing, and an attenuator circuit device mounted in a rectangular opening in one wall of the housing. A plurality of rocker arms are mounted in the housing for pivotable movement on the support member and each rocker arm has shorting bars mounted on opposite ends thereof. Electrical leads, which are mounted on opposite edges of a substrate of the attenuator circuit device, are aligned with respective ones of the shorting bars on the rocker arms. The rocker arms can be selectively pivoted to cause the shorting bars to move between opposed resilient fingers of their respective leads, and out of engagement with the resilient fingers, to selectively provide attenuation of different magnitudes to an external circuit. The attenuator circuit device is retained in the housing by resilient hook-shaped retaining portions of the electrical leads which lock over internal lead-supporting ledges in the housing.

Heretofore, the assembly of the attenuator circuit device in the housing has been accomplished manually, a procedure which is disadvantageous because it is relatively slow and time-consuming. Accordingly, a need exists for a system to accomplish the assembling of the attenuator circuit devices into the housings automatically, without damaging the hook-shaped retaining portions on the electrical leads. In this regard, the hook-shaped retaining portions of the leads, which are of relatively thin stock (e.g., 10 mils), project outward beyond edges of the rectangular opening in the housing for receiving the attenuator circuit device and are susceptible to damage from excessive bending or other deformation during the assembly of the circuit device into the housing. Further, outer ends of the resilient hook-shaped portions do not always seat properly on the inner lead-supporting ledges of the housing. The shorting bars on the rocker arms which are in their operative positions also tend to interfere with the positioning of the resilient fingers of the respective leads into the housing.

Accordingly, a primary purpose of this invention is to provide a system for assembling an article, such as an attenuator circuit device, into a housing, and subsequently inserting the resultant assembly into a magazine in a rapid and efficient manner.

SUMMARY OF THE INVENTION

In general, assembling of an article into a housing in which portions of the article on opposite sides of the housing project outward beyond edges of an opening in the housing for receiving the article, comprises releasing one side of the housing so that the one side of the housing tips downward by gravity to receive the projecting portions on the adjacent side of the article into the opening in the housing. The opposite side of the housing is then released so that the opposite side of the housing drops downward by gravity to receive the projecting portions on the opposite side of the article into the opening in the housing.

More specifically, opposite first and second sides of the housing are clamped by opposed first and second clamping means as the housing is moved horizontally to an initial assembling position above the article. As the housing reaches the initial assembling position, movement of the second clamping means is interrupted such that continued movement of the first clamping means causes the first clamping means to disengage from and release the first side of the housing. The housing then tips with a rotary movement as the first side of the housing drops downward by gravity to partially receive the projecting portions on the first side of the article in the opening in the housing. During the tipping of the housing, a lower edge of the second side of the housing is supported temporarily, and an upper edge of the first side of the housing continues to be engaged by the first clamping means, to control the degree of tipping of the housing. Subsequently, the lower edge of the second side of the housing is released and the second side of the housing drops downward by gravity to partially receive the projecting portions on the second side of the article in the opening in the housing, and to cause outer ends of the projecting portions on the first side of the article to move into interlocking engagement with inner recessed portions of the housing.

Subsequently, outer ends of the projecting portions on the second side of the article also are moved into interlocking engagement with inner recessed portions of the housing. During the assembling operation, operating members within the housing are moved out of advanced positions adjacent the opening in the housing for the reception of the projecting portions of the article into the opening in the housing and the moving of the outer ends of the projecting portions into the interlocking engagement with the inner recessed portions of the housing. After the article has been assembled in the housing, interconnecting strips on the article projecting portions are severed, and the resultant housing-article asseably then is fed into a magazine at a magazine loading station.

BRIEF DESCRIPTION OF THE DRAWINGS

FIG. 5A is a block diagram illustrating the relationship of FIGS. 4 and 5.

FIG. 13 is a cross-sectional view of a subassembly-seating station of the apparatus, taken along the line 13—13 in FIG. 4, in an upper starting position;

FIG. 14 is an enlarged cross-sectional view similar to a portion of FIG. 13 showing the subassembly-seating station in a lower final assembling position;

FIGS. 21–26 are schematic views illustrating an operating sequence of a portion of the magazine loading station shown in FIGS. 6 and 20, taken along the line 21—21 in FIG. 20.

DETAILED DESCRIPTION

Figure 1:
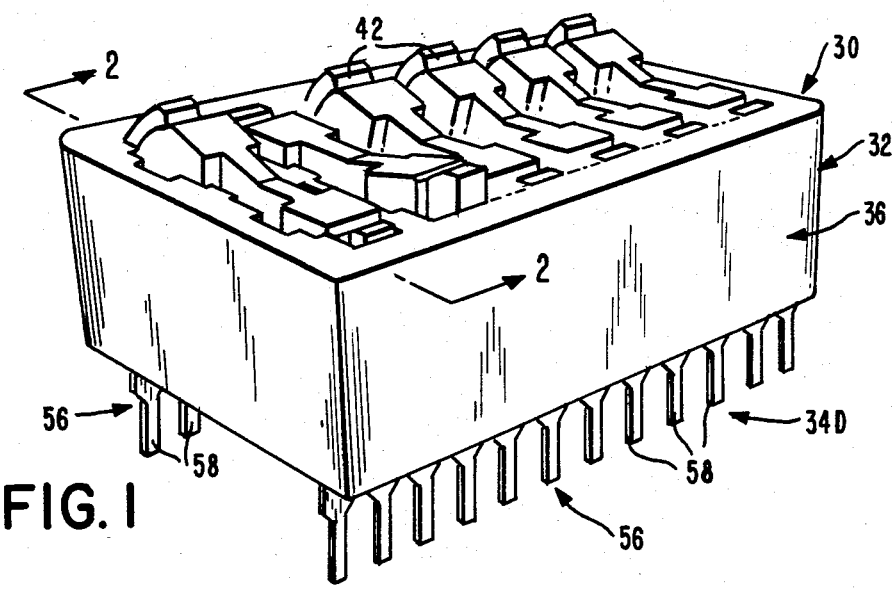
FIG. 1 is an isometric view of a switchable attenuator assembly which may be assembled utilizing the subject invention.
Figure 2:
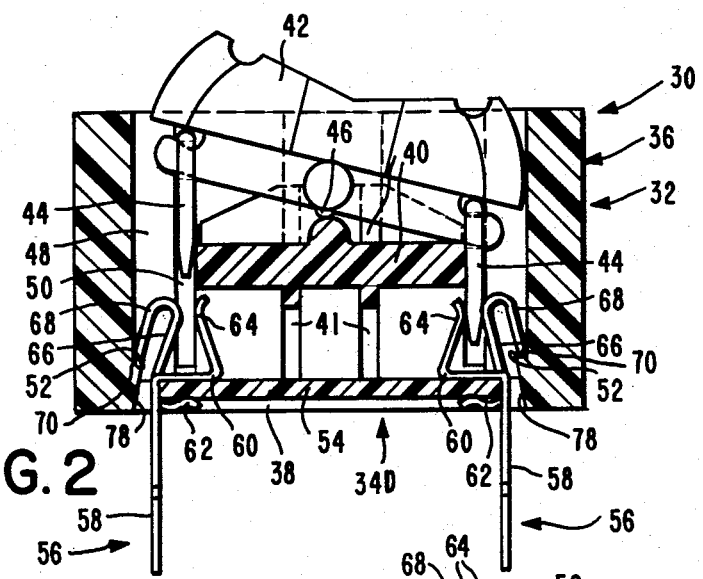
FIG. 2 is a cross-sectional view of the assembly in FIG. 1 taken along the line 2—2 in FIG. 1.

Referring to FIGS. 1 and 2, an article which may be assembled utilizing the subject invention, may be a switchable attenuator assembly 30 of a type as disclosed in U.S. Pat. No. 4,086,548, the disclosure of which is hereby incorporated by reference. The attenuator assembly 30 includes a housing subassembly 32 and an attenuator circuit device 34D mounted in a housing 36 of the housing subassembly. The housing 36 has a rectangular opening 38 (FIG. 2) formed in a lower portion thereof. A rocker arm support member 40 is mounted in the housing 36 with lugs (not shown) thereof disposed between internal vertical guide ribs 41 on end walls of the housing and a plurality of rocker arms 42 are mounted in the housing for pivotal movement.

A pair of operating members, in the form of shorting bars 44, are mounted on opposite ends of each rocker arm 42 for selective movement between a lower advanced operative position (right-hand side of FIG. 2) adjacent the rectangular lower opening 38 in the housing 36, and a retracted inoperative position (left-hand side of FIG. 2) within the housing, by pivoting the rocker arm in one direction or the other. In this regard, each rocker arm 42 is formed with a detent 46 which rides on a semi-circular portion of the support member 40 as the rocker arm is pivoted, so that when the detent is engaged on one side or the other of the semi-circular portion the detent will retain the rocker arm in that position until pressure is applied to the rocker arm to pivot the rocker arm to another position. The shorting bars 44 move vertically in guideways defined in part by spaced first vertical ribs 48 on opposite sidewalls of the housing 36, and in part by second spaced vertical ribs 50 of reduced width formed on the first ribs for guiding opposite edges of the bars. The opposite side walls of the housing 36 also have internal longitudinally extending horizontal lead-supporting ledges 52 formed thereon.

Figure 3:
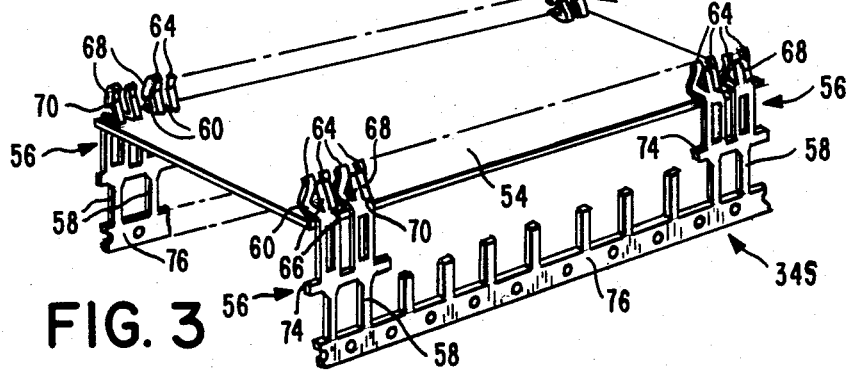
FIG. 3 is an isometric view of a substrate-lead subassembly, prior to being asserbled into a housing of the assembly shown in FIGS. 1 and 2 utilizing the subject invention.

FIG. 3 shows an article in the form of a substrate-lead subassembly 34S from which the attenuator circuit device 34D in FIGS. 1 and 2 is formed in conjunction with the assembling of the substrate-lead subassembly into the housing 36 utilizing the subject invention. Thus, referring to FIGS. 2 and 3, it is seen that the resultant attenuator circuit device 34D (FIG. 2) includes a substrate 54 having resistive attenuating circuits (not shown) formed on the under side thereof. A row of electrical leads 56, formed from relatively thin stock, such as 10 mils, and having elongated stems 58, is mounted on each side of the substrate 54 by a pair of resilient upper contact fingers 60 (best shown in FIG. 3) and an opposed resilient lower central contact finger 62 (FIG. 2). The contact fingers 60 and 62 of each lead 56 project from an upper end of the lead stem 58 to define a first gap in which the substrate 54 is received, with the lower contact finger 62 engaging a contact pad or node (not shown) of one of the attenuating circuits on the substrate. Each of the upper contact fingers 60 also includes an upwardly projecting leg portion 64 which cooperates with an opposed vertical central contact finger 66 on the lead stem 58 to define a second gap for receiving a portion of one of the shorting bars 44 (FIG. 2) therebetween. The vertical central contact finger 66 merges into a retaining hook 68 having an outer end 70 engageable with the adjacent inner support ledge 52 (FIG. 2) of the housing 36 in interlocking relationship, to retain the attenuator circuit device 34D seated against lower ends of the guide ribs 41 and 48 in the housing.

Referring to FIG. 3, prior to the assembly of the substrate-lead subassembly 34S into the housing 36, the elongated stems 58 of the leads 56 on each side of the substrate 54 are rigidly interconnected by integral intermediate straps 74 and outer support rails 76 having indexing apertures therein. After the substrate-lead subassembly 34S has been assembled into the housing 36 utilizing the methods and apparatus of this invention, the straps 74 and the support rails 76 are severed from the stems 58 of the leads 56 by the apparatus to make the stems independent of one another, thus forming the attenuator circuit device 34D as shown in FIGS. 1 and 2. The stems 58 of the leads 56 then can be electrically connected to circuits on a printed circuit board (not shown) for providing attenuation in the circuits as described in the above mentioned U.S. Pat. No. 4,086,548.

As is apparent from FIG. 2, the outer ends 70 of the retaining hooks 68 on the vertical lead contact fingers 66 project horizontally beyond respective lower inner edges 78 of the opening 38 in the housing 36. Accordingly, the contact fingers 66 and the retaining hooks 68, which are formed from thin stock as noted above, are relatively fragile and thus readily subject to bending or other damage during the assembling of the substrate-lead subassembly 34S into the opening 38 in the housing 36 unless special precautions are taken. Further, excessive pressure on the contact fingers 66 and the retaining hooks 68 during the assembling operation could produce other damage to the substrate 54 and/or the leads 56. Thus, a primary purpose of the subject invention is to provide a system for accomplishing the assembling of the substrate-lead subassembly 34S into the housing 36 without damaging the substrate 54 and/or the leads 56.

GENERAL

Figure 4:
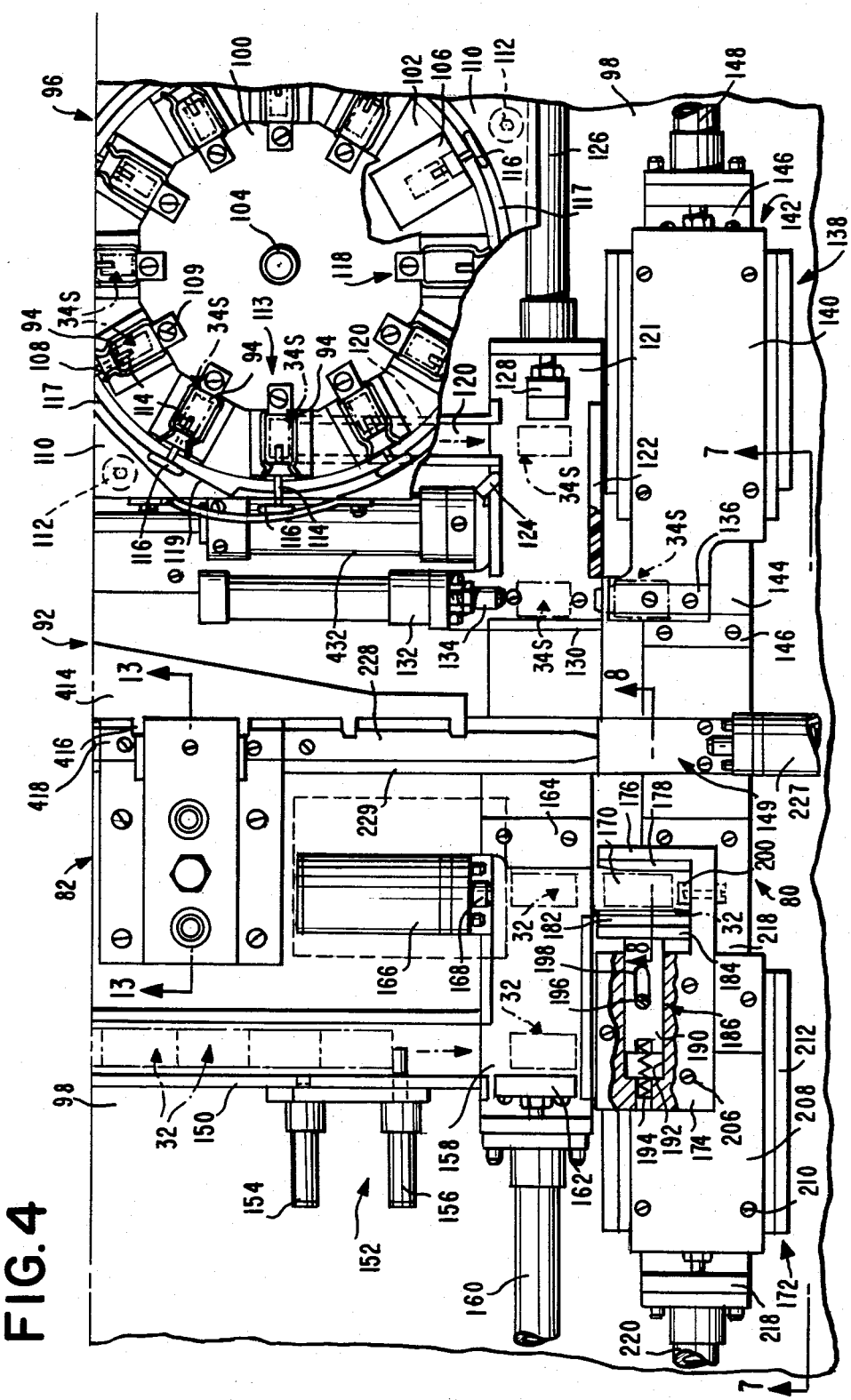
FIG. 4 is a plan view of a portion of an apparatus in accordance with the subject invention.
Figure 7:
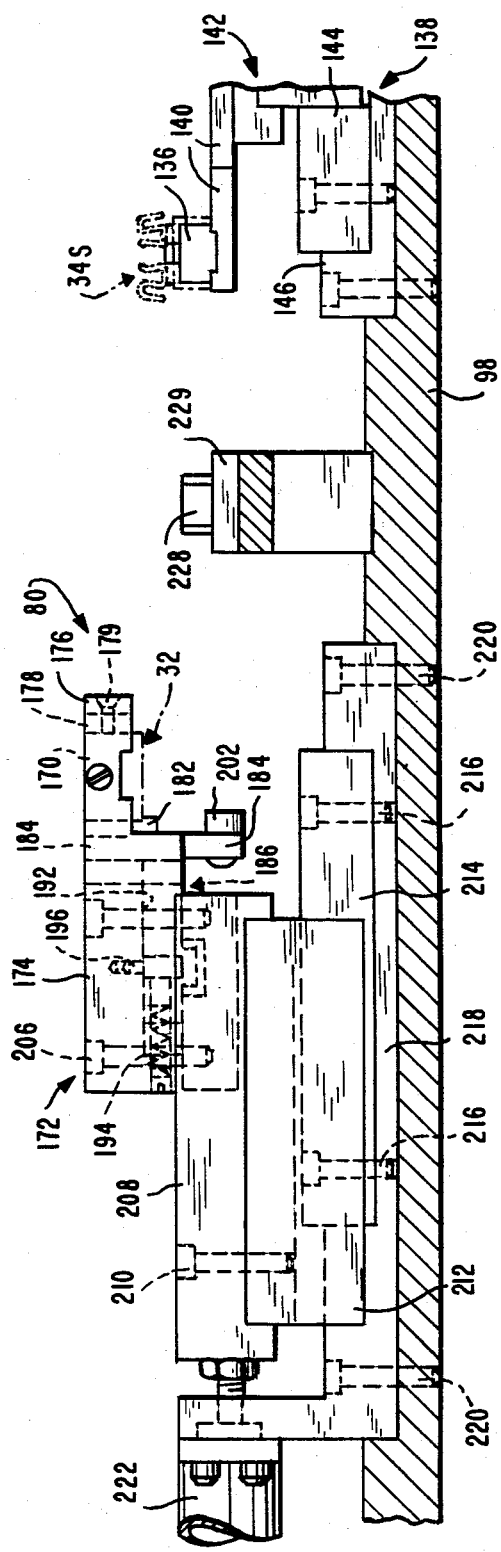
FIG. 7 is an elevational view of an initial assembling station of the apparatus, as seen along the line 7—7 in FIG. 4.
Figure 8:
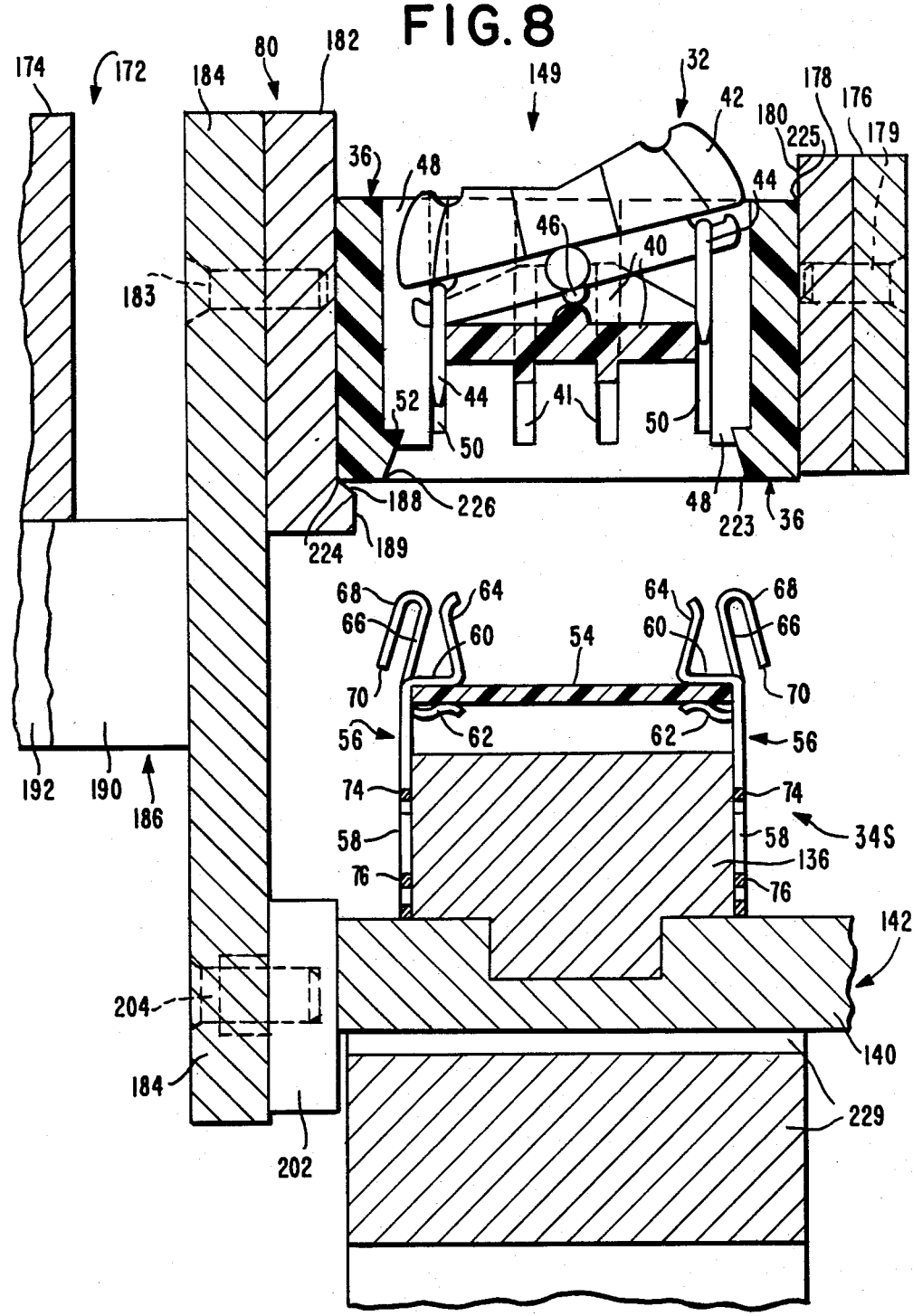
FIG. 8 is an enlarged partial cross-sectional view of the initial assembling station, taken along the line 8—8 in FIG. 4 and showing a first assembling stage of the apparatus.

In general, referring to FIGS. 4, 7 and 8, in the disclosed apparatus in accordance with the invention, partial assembling of one of the substrate-lead assemblies 34S into the rectangular opening 38 in one of the housings 36 is accomplished in an initial assembling station 80. The steps involved in the partial assembling operation are illustrated in detail in FIGS. 8 through 12, with the outer ends 70 of the retaining hooks 68 of the leads 56 on one side of the subassembly 34S ultimately becoming seated on the adjacent internal support shelf 52 of the housing 36 in interlocking engagement therewith, as shown in FIG. 12.

An additional stage of the assembling operation is accomplished in a subassembly seating station 82 as shown in FIGS. 4, 13, 14 and 15. Referring to FIGS. 13 and 14, in the subassembly seating station 82 the rocker arms 42 in the housing 36 initially are moved clockwise to a slightly overcenter position as shown in FIG. 14 so that, as viewed in this figure, the shorting bars 44 on the left-hand side of the housing do not interfere with insertion of the adjacent leads 56 into the housing, and so that the shorting bars on the right-hand side of the housing do not disrupt the seating of the previously seated adjacent leads 56. The left-hand side of the substrate-lead subassembly 34S then is pushed further into the housing 36, with the outer ends 70 of the retaining hooks 68 on the left-hand leads 56 seating on the adjacent internal support ledge 52 of the housing as shown in FIG. 14. Seating of any of the lead hooks 68 which did not seat properly on the support ledge 52 then is accomplished in a subsequent lead-seating station 84, as shown in FIGS. 5, 16, 17, 18 and 19, to complete the assembling of the substrate-lead subassembly 34S into the housing 36.

Figure 5:
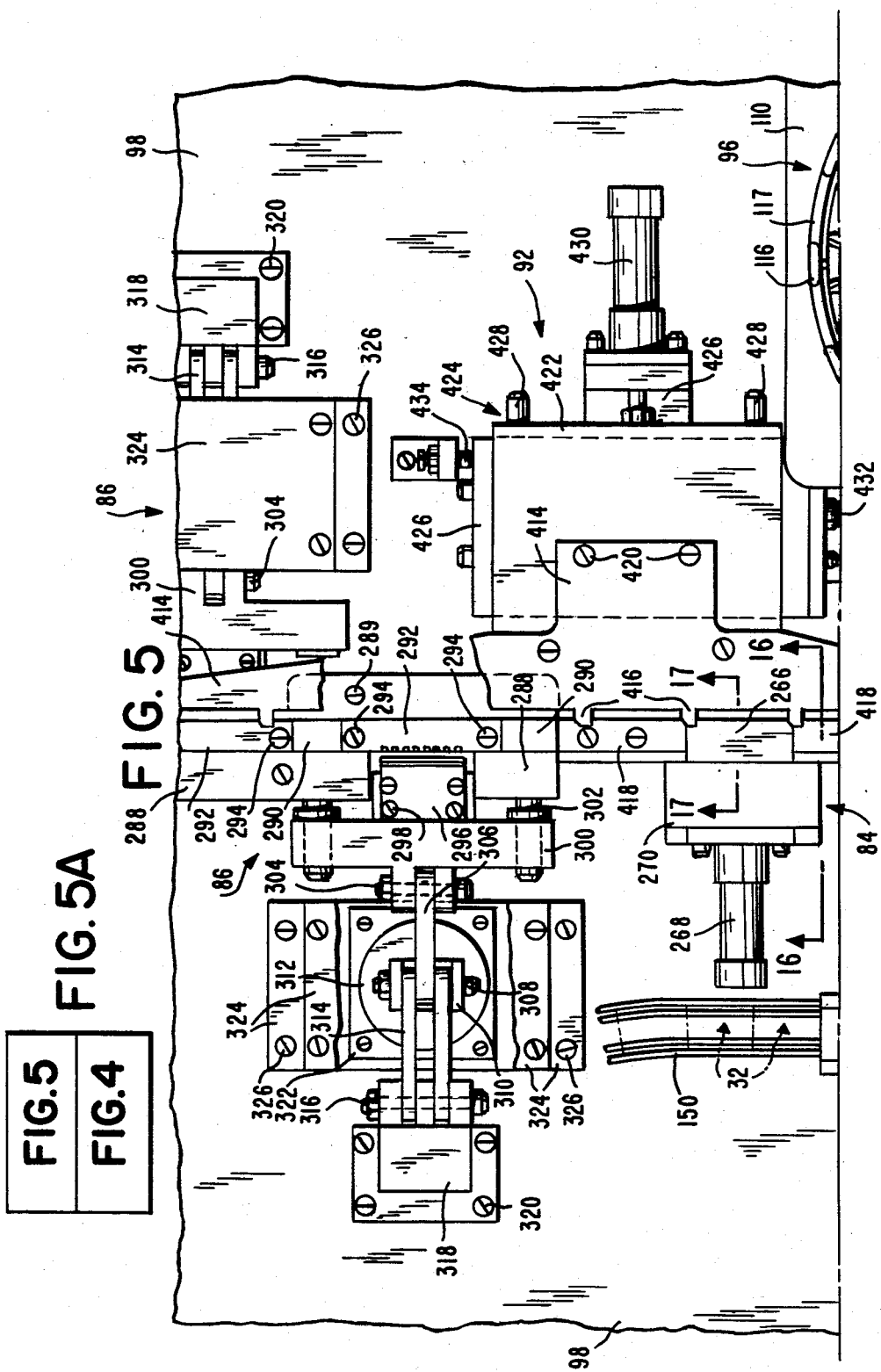
FIG. 5 is a plan view of a second portion of the apparatus.
Figure 6:
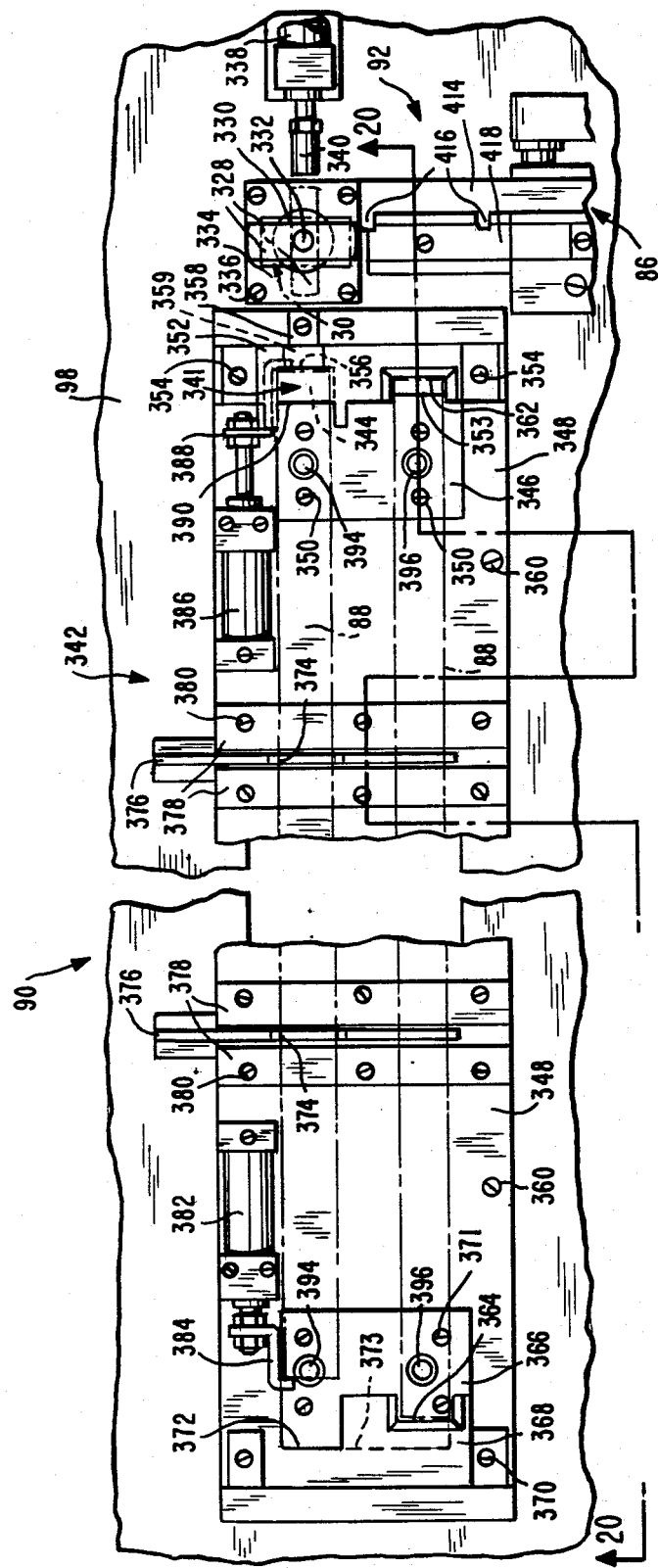
FIG. 6 is a plan view of a third portion of the apparatus.

The connecting straps 74 and the support rails 76 next are severed from both sets of the leads 56 on the opposite sides of the substrate-lead subasembly 34S in a pair of successive shearing stations 86 (FIG. 5), to form the attenuator circuit device 34D (FIGS. 1 and 2). The completed attenuator assembly 30 then is fed into a magazine 88 in a magazine loading station 90 (FIGS. 6 and 20–26). The housing subassemblies 32 and the substrate-lead subassemblies 34S are indexed between the various processing stations 80, 82, 84, 86 and 90 by an indexing mechanism 92 (FIGS. 4, 5 and 6).

INITIAL ASSEMBLING STATION (FIGS. 4 and 7–12)

Referring to the upper right-hand portion of FIG. 4, the substrate-lead assemblies 34S are fed to the initial assembling station 80 from tubular magazines 94 of rectangular cross-section removably mounted on a suitable turntable assembly 96 supported above a base plate 98 of the apparatus. By way of illustration, in the disclosed embodiment of the invention the turntable assembly 96 includes an upper multi-sided plate 100 and a lower circular plate 102 secured to upper and lower ends, respectively, of a vertical shaft 104. The lower plate 102 has a plurality of peripherally spaced upstanding socket members 106 mounted thereon for receiving lower ends of the tubular magazines 94 in alignment with vertical feed passages extending through the lower plate 102. The upper plate 100 has a plurality of peripherally spaced sets of spring clips 108 mounted thereon by screws 109, for receiving upper end portions of the tubular magazines 94. The turntable assembly 96 is suitably journaled at its lower end in a horizontal platform 110 supported in an elevated position above the base plate 98 on vertical posts 112 (two shown in dashed lines in FIG. 4). The turntable asembly 96 is indexable by a suitable pawl-and-ratchet type indexing mechanism (not shown) mounted beneath the platform 110 on the base plate 98.

The tubular magazines 94 are precluded from dropping through the open socket members 106 and the feed passageways in the lower plate 102, and the substrate-lead subassemblies 34S in each magazine are precluded from feeding downward out of the magazine until the magazine is indexed into a feed position 113 at the left-hand side of the turntable assembly 96 in FIG. 4, by retaining pins 114 slidably mounted in the lower plate and extending into the feed passageways. In this connection, the retaining pins 114 are retained in advanced positions in the feed passageways of the lower plate 102 for this purpose by discs 116 on outer ends of the pins riding in a circular groove 117 in the platform 110 as the turntable assembly 96 is indexed counterclockwise from a magazine removal-and-loading position 118 in FIG. 4. As each magazine 94 is advanced into the feeding position 113, however, the disc 116 on the retaining pin 114 for the magazine is cammed outward by a cam surface 119 on the platform 110 to a retracted position to permit the column of substrate-lead assemblies 34S in the magazine to drop vertically in the magazine through a feed passageway (not shown) in the platform 110 to a suitable escapement mechanism (not shown) mounted beneath the platform.

The above-mentioned escapement mechanism (not shown) releases each of the substrate-lead subassemblies 34S into an upper vertical end portion of an arcuate feed chute 120 mounted beneath the platform 110. The released substrate-lead subassenbly 34S is discharged from a lower horizontal end of the feed chute 120 onto a small feed table 121 mounted on the base plate 98, so that the support rails 76 (FIG. 3) of the subassembly are facing downward and supporting the subassembly on the feed table. More specifically, the released subassembly 34S is discharged through a guide opening between upstanding guide portions of the feed table 121, with the inertia of the subassembly being absorbed by the subassembly striking a rubber pad 122 bonded to an upstanding portion of the feed table at the opposite side thereof. To preclude excessive rebound of the subassembly 34S from the rubber pad 122, an air jet 124 may be suitably mounted on the feed table 121 and directed toward the pad, if so desired.

With further reference to FIG. 4, after the substrate-lead subassembly 34S has been fed onto the feed table 121 from the feed chute 120, an air cylinder 126, which is mounted on an upstanding flange at the right-hand end of the feed table as viewed in FIG. 4, is operated to advance a feed block 128 to the left in this figure. The feed block 128 then moves the subassembly 34S over the feed table 121 into engagement with an upstanding stop portion 130 of the feed table at the left-hand side thereof, as viewed in FIG. 4. Another air cylinder 132, mounted on another upstanding flange of the feed table 121, then is operated to advance a cylindrical push rod 134 into engagement with the subassembly 34S to push the subassembly onto an anvil-shaped guide member 136 of a slide mechanism 138 in the initial assembling station 80, as illustrated in FIG. 7.

As is shown in FIGS. 4 and 7, the anvil-shaped guide member 136 is mounted on an outer end of an arm portion of a top plate member 140 of a movable slide assembly 142. The movable slide assembly 142 is supported for horizontal reciprocal movement on a block member 144 secured to a base member 146 fixedly mounted on the base plate 98. An air cylinder 148 (FIG. 4) is mounted on an upstanding flange of the base member 146 and has a piston rod secured to the movable slide assembly 142. After one of the substrate-lead subassemblies 34S has been positioned on the anvil-shaped guide member 136, as shown in FIG. 7, the air cylinder 148 is operated to advance the guide member and the subassembly to the left in FIGS. 4 and 7, to position the subassembly in an assembling position 149 in the initial assembling station 80, as shown in FIG. 8.

Referring to FIGS. 4 and 5, the housing subassemblies 32 are fed in succession to the initial assembling station 80 (FIG. 4) from a vibratory feeder (not shown) down an inclined guide track 150 suitably mounted on the base plate 98. In this regard, the housing subassemblies 32 are fed down the guide track 150 to an escapement mechanism 152 (FIG. 4) which comprises a pair of sequentially operable air cylinders 154 and 156 for releasing the subassemblies one at a time to a second small feed table 158, in a well-known manner.

After one of the housing subassemblies 32 has been released by the escapment mechanism 152 onto the second feed table 158, an air cylinder 160, which is mounted on an upstanding bracket portion of the feed table, is operated to cause a pusher block 162 to advance the housing subassembly to the right in FIG. 4 between elongated integral guide portions of the feed table and against a stop member 164 secured to the top of the feed table. Another air cylinder 166, which also is mounted on an upstanding bracket portion of the feed table 158, then is operated to cause a push rod 168 to push the housing subassembly 32 into a rectangular slot 170 in a second slide mechanism 172, as illustrated in FIGS. 4 and 7.

As is best shown in FIG. 4, the housing subassembly-receiving slot 170 of the slide mechanism 172 is defined by a portion of a rectangular opening formed in one side of an upper support block 174 of the slide mechanism. More specifically, a right-hand side of the slot 170 is defined by an arm 176 of the support block 174, and a guide plate 178 secured to an inner side of the arm by screws 179 (FIGS. 7 and 8) and having an inner vertical planar surface 180 (FIG. 8). An opposite side of the slot 170 is defined by a movable clamping plate 182 secured by screws 183 (FIG. 8) to a vertical plate portion 184 of a horizontally movable secondary slide 186. The clamping plate 182 has an inclined support ledge 188 (FIG. 8) and an adjacent vertical surface 189 (FIG. 8) extending along a lower edge portion thereof.

The secondary slide 186 also includes an elongated body portion 190 (FIG. 4) slidably mounted for horizontal movement in a guide channel 192 in an underside of the upper support block 174. The secondary slide 186 is biased to the right in FIGS. 4 and 7 by a coil spring 194 having opposite ends disposed in recesses in the upper support block 174 and the slide body portion 190, respectively. Movement of the slide 186 in the guide channel 192 is limited by a screw member 196 screw-threadedly mounted in the upper support block 174 and having an unthreaded shank portion disposed in an elongated slot 198 (FIG. 4) in the slide body portion 190. An inner end of the subassembly-receiving slot 170 is defined by a stop member 200 (FIG. 4) secured to the upper support block 174. A lower end of the slide vertical plate portion 184 has a cam block 202 (FIG. 8) secured thereto by screws 204 (only one shown).

As is best shown in FIG. 7, the upper support block 174 of the slide mechanism 172 is fixedly mounted by screws 206 on a lower support block 208 secured by screws 210 to a movable slide member 212. The movable slide member 212 is mounted on a fixed guide member 214 secured by screws 216 to a mounting plate 218 mounted on the base plate 98 by screws 220. The slide mechanism 172 is reciprocable by an air cylinder 222 mounted on an upstanding bracket portion of the mounting plate 218 and having a piston rod connected to the lower support block 208.

After one of the substrate-lead subasseablies 34S has been fed into the initial asseabling position 149 as shown in FIG. 8 as above described, and one of the housing subassemblies 32 has been fed into the slot 170 of the slide mechanism 172 with the opening 38 in the housing 36 facing downward, as illustrated in FIG. 7, the air cylinder 222 is operated to move the housing subassembly toward the substrate-lead subassembly in the initial assembling position. As the housing subassembly 32 reaches the initial assembling position, the cam block 202 of the slide mechanism 172 engages an adjacent end of the top plate member 140 of the slide assembly 142, as shown in FIG. 8, to interrupt movement of the spring-biased secondary slide 186 and the clamping plate 182 thereon.

Figure 9:
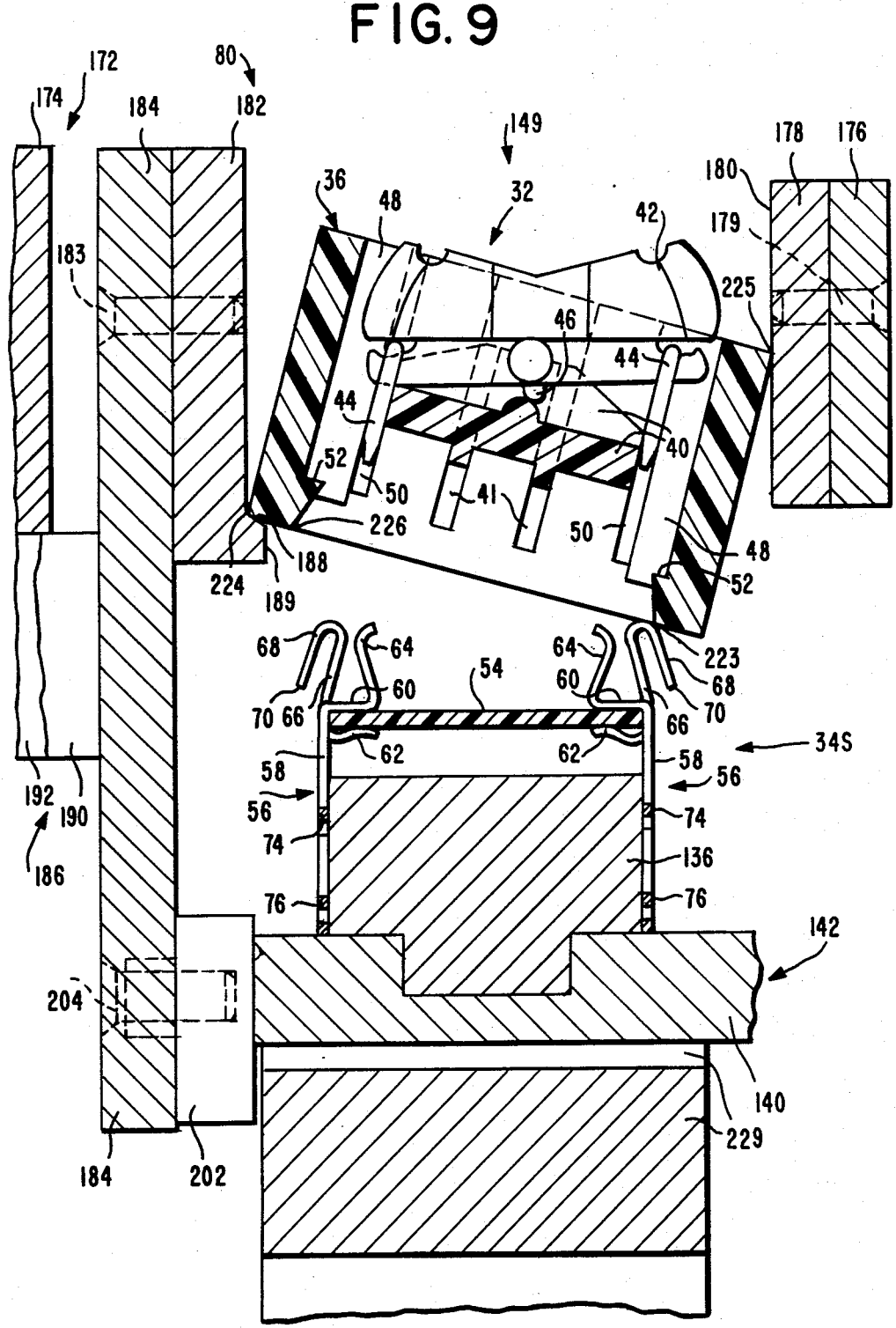
FIGS. 9, 10, 11 and 12 are cross-sectional views similar to FIG. 8, showing additional assembling stages of the apparatus.

Referring to FIG. 9, the remainder of the slide mechanism 172, including the upper support block 174 and the guide plate 178 on the clamping arm 176 of the upper support block, continues to move to the right in this figure relative to the clamping plate 182 on the secondary slide 186. As viewed in FIG. 9, since the left-hand lower edge of the housing 36 is supported on the inclined support ledge 188 of the clamping plate 182, the housing subassembly 32 then begins to tip clockwise by gravity until an inner bottom edge 223 of the housing engages on top of the retaining hooks 68 of the leads 56 on the right-hand side of the substrate-lead subassembly 34S.

Figure 10:
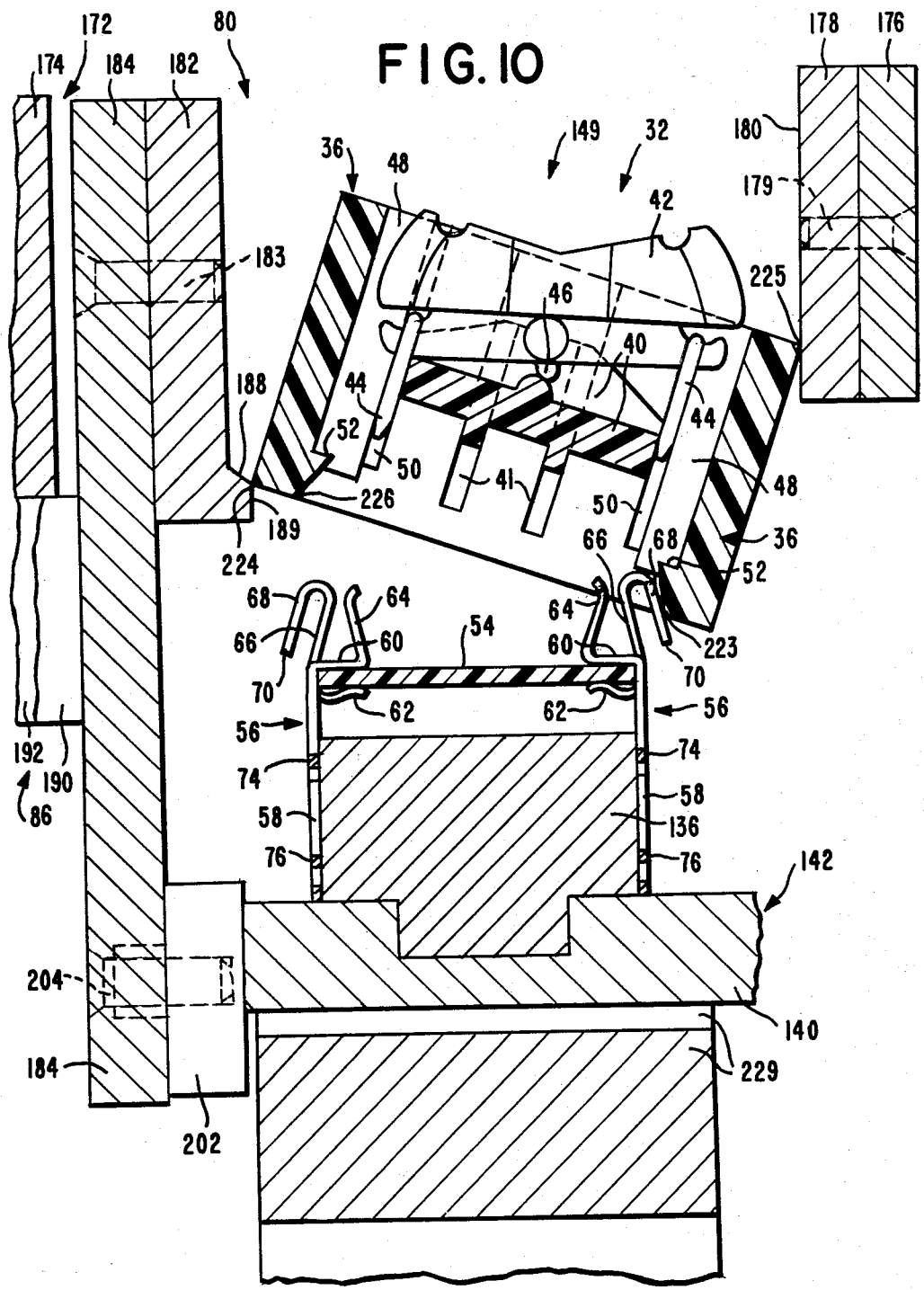

Referring to FIG. 10, as the clamping arm 176 of the upper support block 174 travels through a final increment of its movement, such as 30 mils (exaggerated in FIG. 10 for purposes of illustration) the housing subassembly 32 slides downward to the right as shown in this figure. More specifically, the inner lower edge 223 of the housing 36 begins to slide down outer surfaces of the lead retaining hooks 68. At the same time an outer lower edge 224 of the housing 36 slides down the inclined support ledge 188 on the movable clamping plate 182 to the intersection of the ledge and the adjacent vertical surface 189 of the movable clamping plate. During this sliding movement of the housing 36, the tipping of the housing is controlled by an upper edge 225 of the housing remaining in engagement with the vertical surface 180 of the guide plate 178 on the clamping arm 176.

Figure 11:
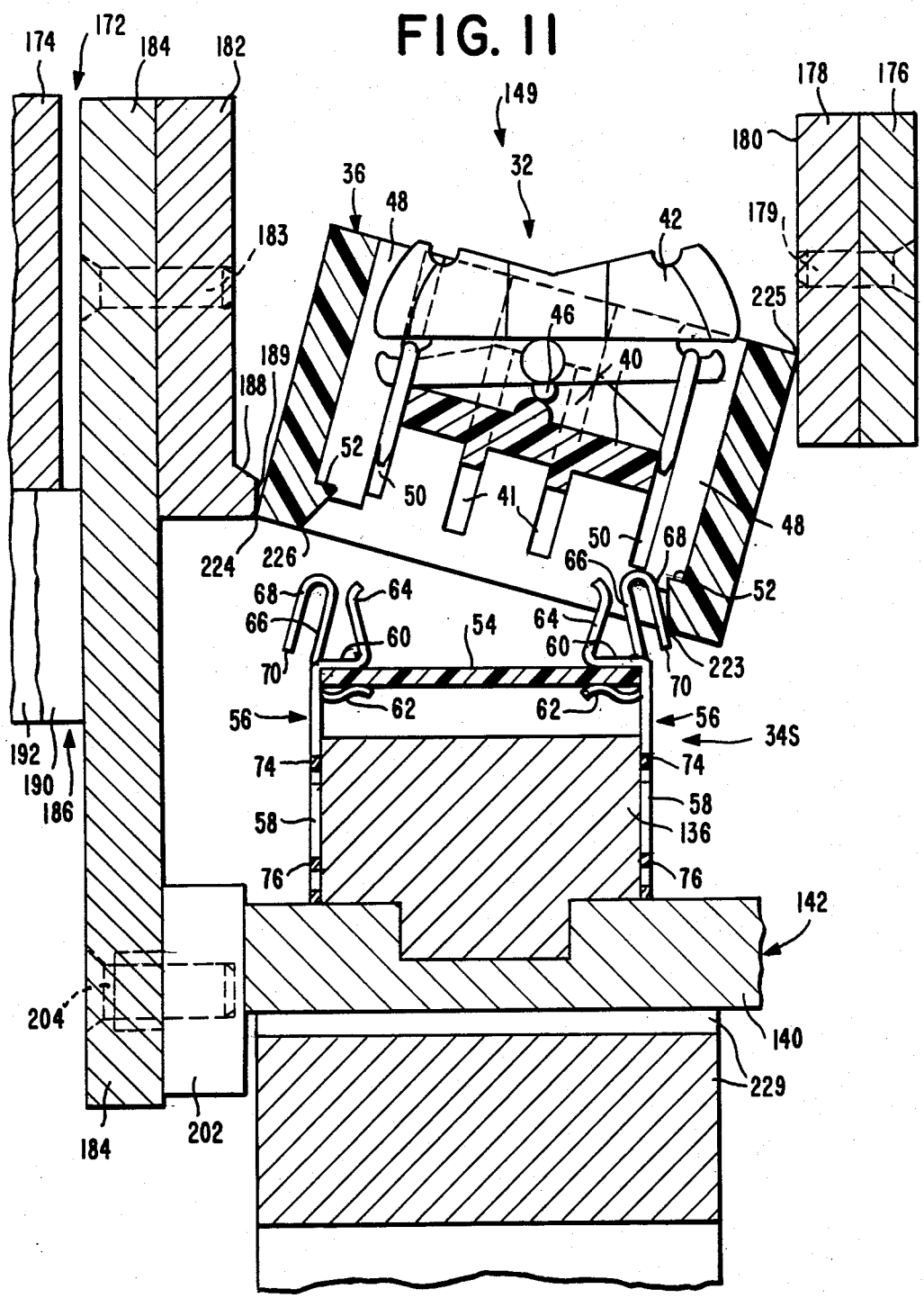
Figure 12:
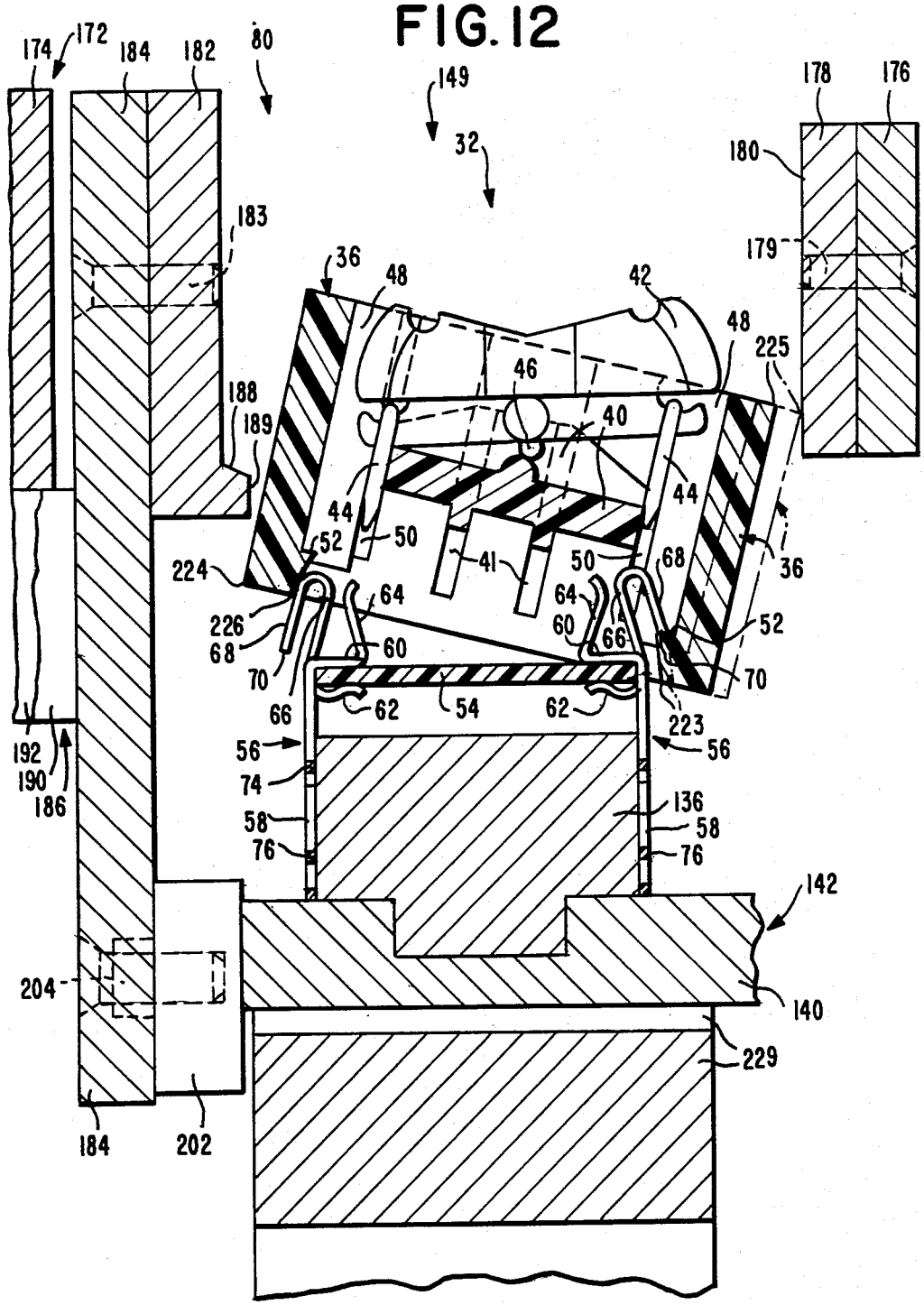

Referring to FIG. 11, the housing subassembly 32 now drops essentially vertically by gravity with the housing outer edge 224 sliding down the clamping plate vertical surface 189 and the housing upper edge 225 sliding down the guide plate vertical surface 180. At the same time, the housing subassembly 32 tips slightly counter-clockwise as viewed in FIG. 11, with the housing inner edge 223 continuing to slide down the outer surfaces of the adjacent lead retaining hooks 68.

Referring to FIG. 12, as the housing subassembly 32 continues to drop vertically by gravity, the housing 36 reaches a point, as indicated by broken lines at the right-hand side of this figure, in which the right-hand inner support ledge 52 of the housing is slightly below the outer ends 70 of the adjacent lead-retaining hooks 68. At substantially the same time an inner edge 226 of the housing 36 on the opposite side thereof engages outer surfaces of the other lead-retaining hooks 68 adjacent thereto and slides down the outer surfaces a short distance, as shown in solid lines in FIG. 12. As a result, the housing subassembly 36 tips further counterclockwise slightly and shifts to the left in FIG. 12, causing the right-hand inner ledge 52 of the housing 36 to shift from the broken line position to a solid line position under the outer ends 70 of the adjacent lead-retaining hooks 68, so that the ledge and the hook outer ends become interlocked with one another.

SUBASSEMBLY-SEATING STATION (FIGS. 4, 13, 14 and 15)

After the substrate-lead subassembly 34S has been partially inserted into the housing 36 as shown in FIG. 12, an air cylinder 227, which is mounted on the base plate 98, is energized to push the resultant housing-substrate-lead assembly 32, 34S from the guide member 136 onto a fixed guide member 228 secured to a support member 229 mounted on the base plate. The housing substrate-lead assembly 32, 34S then is indexed by the indexing mechanism 92 to the subassembly-seating station 82 shown in FIGS. 4, 13, 14 and 15.

As noted hereinabove, in the subassembly-seating station 82 the rocker arms 42 in the housing 36 initially are moved clockwise to a slightly overcenter position to raise the shorting bars 44 in the left-hand side of the housing, as viewed in FIG. 14, from their advanced lower positions adjacent the housing opening 38, to intermediate positions in which they will not interfere with the seating of the outer ends 70 of the adjacent lead retaining hooks 68 on the adjacent inner support ledge 52 of the housing. At the same time, the shorting bars 44 on the right-hand side of the housing do not move into engagement with the adjacent previously seated lead-retaining hooks 68 so as to damage the hooks or disrupt the seating thereof. The substrate-lead subassembly 34S then is pushed vertically upward into the housing 36 as illustrated in FIG. 14.

More specifically, with reference to FIGS. 13 and 14, the setting of the rocker arms 42 to their slightly over-center position is accomplished by a vertically movable cam block 230. The cam block 230 has front (see FIG. 15) and rear horizontal edge surfaces 231, for engaging front and rear upper edge portions, respectively, of the housing 36, as shown in FIG. 14 by the rear edge surface. Between the front and rear edge surfaces 231, the cam block also includes upwardly recessed, stepped cam surfaces 232 and 233, which are slightly offset with respect to one another, such as by 15 mils, for engaging respective opposite ends of the rocker arms 42, as shown in FIG. 14. The cam block 230 is secured to a cantilevered portion of a horizontal upper support plate 234 (FIG. 13) mounted for sliding vertical movement on a pair of upstanding guide pins 235. The guide pins 235 have their lower ends press-fitted into a horizontal lower support plate 236 secured by screws (not shown) to the base plate 98. The upper support plate 234 is secured to the upper end of a piston rod of an air cylinder 237 mounted on the lower support plate 236 by screws 238. Downward movement of the cam block 230 and the upper support plate 234 is limited by a cylindrical stop member 240 surrounding the piston rod of the air cylinder 237.

Figure 15:
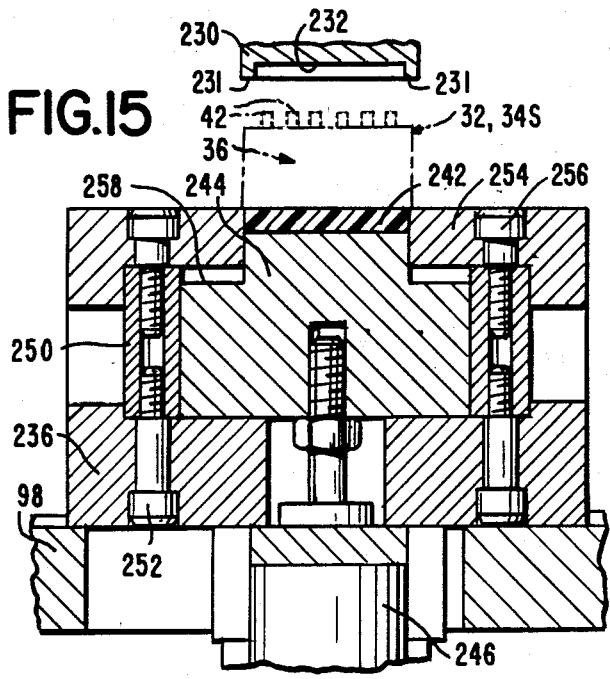
FIG. 15 is a cross-sectional view taken along the line 15—15 in FIG. 13.

With further reference to FIG. 13, the housing-substrate-lead assembly 32, 34S is indexed into the subassembly seating station 82 so that the subassembly 34S is superimposed on a pusher pad 242 of a resilient material, such as polyurethane. The pusher pad 242 is bonded to an upper projecting portion of a pusher block 244 mounted on a piston rod of an air cylinder 246 secured to the lower support block 236 by screws 248. The pusher block 244 is movable vertically in a slot in a lower guide member 250 secured to the lower support block 236 by screws 252 (FIG. 15) and a slot in an upper guide member 254 secured to the lower guide member by screws 256 (FIG. 15). As is best shown in FIG. 15, upward movement of the pusher pad 242 and the pusher block 244 is limited by shoulders 258 of the pusher block engaging opposed surfaces of the upper guide member 254.

As viewed in FIG. 13, after the housing-substrate-lead assembly 32, 34S has been indexed into the subassembly seating station 82, the air cylinder 237 is energized to move the cam block 230 downward in FIG. 13, so that the bottom cam surface 232 engages the upper right-hand ends of the rocker arms 42 thereneath. At the same time, the front and rear horizontal edge surfaces 231 of the cam block 230 engage an upper left-hand edge of the housing 36. As a result, the cam surface 232 causes the rocker arms 42 to begin pivoting clockwise in FIG. 13, and the horizontal edge surfaces 231 simultaneously pivot the housing 36 counterclockwise in this figure. Referring to FIG. 14, this causes the shorting bars 44 on the left-hand ends of the rocker arms 42, as viewed in this figure, to be withdrawn upward away from the adjacent leads 56 and the opening 38 in the housing. At the same time the pivoting of the housing 36 by the cam block edge surfaces 231 causes the left-hand side of the housing to be pushed downward over the retaining hooks 68 of the adjacent leads 56. Eventually, the cam block 230 reaches a downward position as shown in FIG. 14, in which the horizontal edge surfaces 231 are in firm engagement with their respective front and rear upper edge portions of the housing 36. Further, the stepped cam surfaces 232 and 233 are engaged with their respective opposite ends of the rocker arms 42 to locate the rocker arms in a slightly overcenter clockwise position, as viewed in FIG. 14, so that the rocker arms will not snap back counterclockwise into their initial overcenter positions as shown in FIGS. 8–12.

The air cylinder 246 (FIG. 13) next is energized to move the pusher pad 242, and thus the substrate-lead subassembly 34S, vertically upward as shown in FIG. 14, to seat the substrate 54 firmly in the housing 36 against the bottoms of the guide ribs 41 and 48 and other molded seats (not shown) in the housing. During this seating operation, the majority, if not all, of the outer ends 70 of the retaining hooks 68 on the leads 56 at the left-hand side of the substrate 54, as viewed in FIG. 14, engage over the adjacent inner support ledge 52 of the housing 36. The air cylinders 237 and 246 then are de-energized, and the housing-substrate-lead assembly 32, 34S then is ready to be indexed to the lead seating station 84.

LEAD-SEATING STATION (FIGS. 5 and 16-19)

The lead-seating station 84 (FIGS. 5 and 16-19), for seating any of the outer ends 70 of the retaining hooks 68 of the leads 56 which did not seat properly on the inner support ledge 52 of the housing 36 in the subassembly-seating station 82, includes a vertically disposed first support block 260 (best shown in FIG. 16) having an elongated seat portion 262 at the upper end of the block for guiding and supporting one of the housing-substrate-lead assemblies 32, 34S in the lead-seating station. The first support block 260 is secured by screws 263 (only one shown) to the base plate 98.

As the housing-substrate-lead assembly 32, 34S is indexed into the lead-seating station 84, upper edge portions of the housing 36 are received in a stepped slot 264 in a guide block 266 in close-fitting relationship with the guide block. The guide block 266 is supported on an outer end of a piston rod of an air cylinder 268 mounted on an upper end of a vertically disposed second support block 270 by screws 272. The second support block 270 is secured to the first support block 260 by screws 274 (only one shown).

Figure 16:
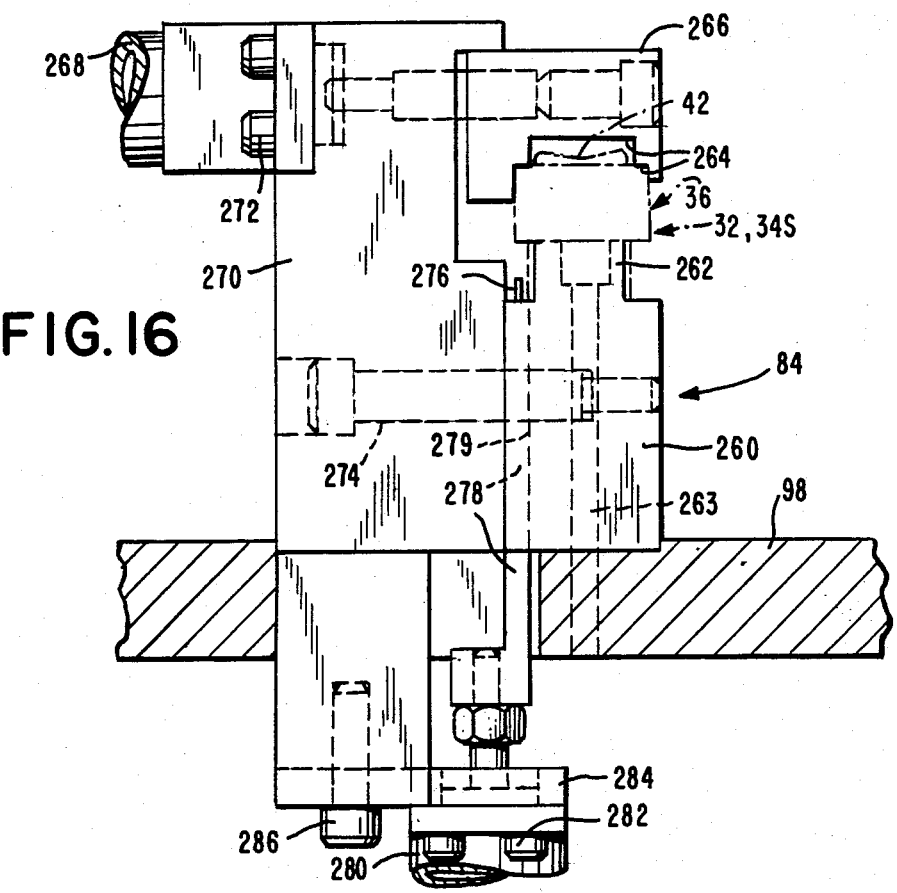
FIG. 16 is an elevational view of a lead-seating station of the apparatus, taken along the line 16—16 in FIG. 5, in a starting position.
Figure 17:
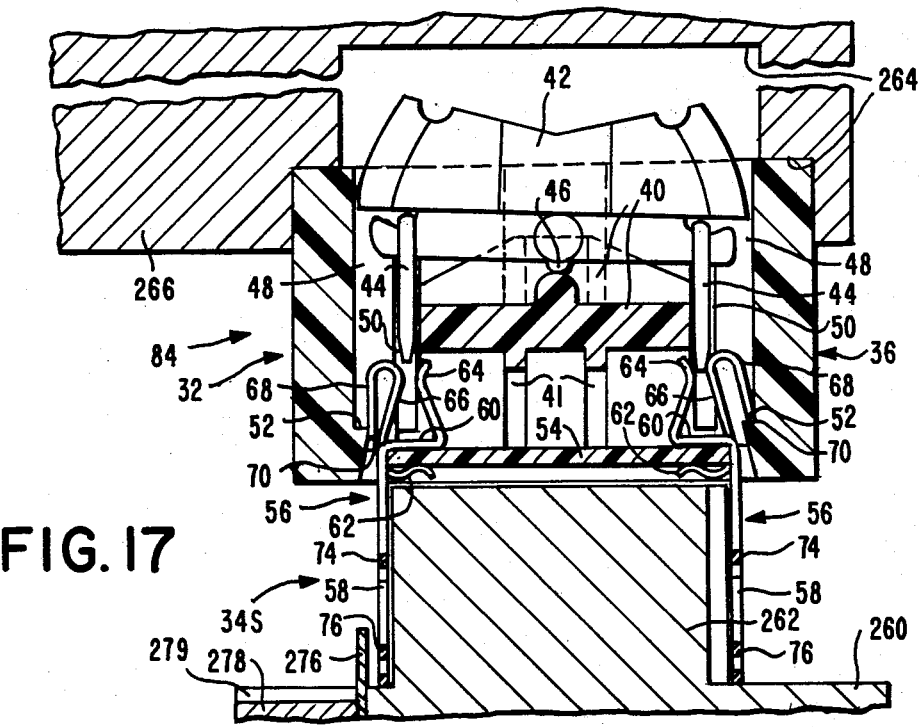
FIG. 17 is an enlarged cross-sectional view of the lead-seating Cstation shown in FIG. 16 in the starting position, taken along the line 17—17 in FIG. 5.

As is best shown in FIG. 17, as the housing-substrate-lead assembly 32, 34S is indexed into the lead-seating station 84, the stems 58 of the left-hand leads 56 in this figure become located between the seat portion 262 of the first support block 260 and a lead-seating blade 276 located in spaced relationship to the support block. The lead-seating blade 276 is secured by screws (not shown) to an upper end of a vertically extending carrying member 278 (FIG. 16) disposed in a vertical slot 279 in the first support block 260. A lower end of the carrying member 278 is mounted on a piston rod of an air cylinder 280 mounted by screws 282 on a horizontal plate 284 secured to a lower end of the second support block 270 by screws 286 (only one shown).

Figure 18:
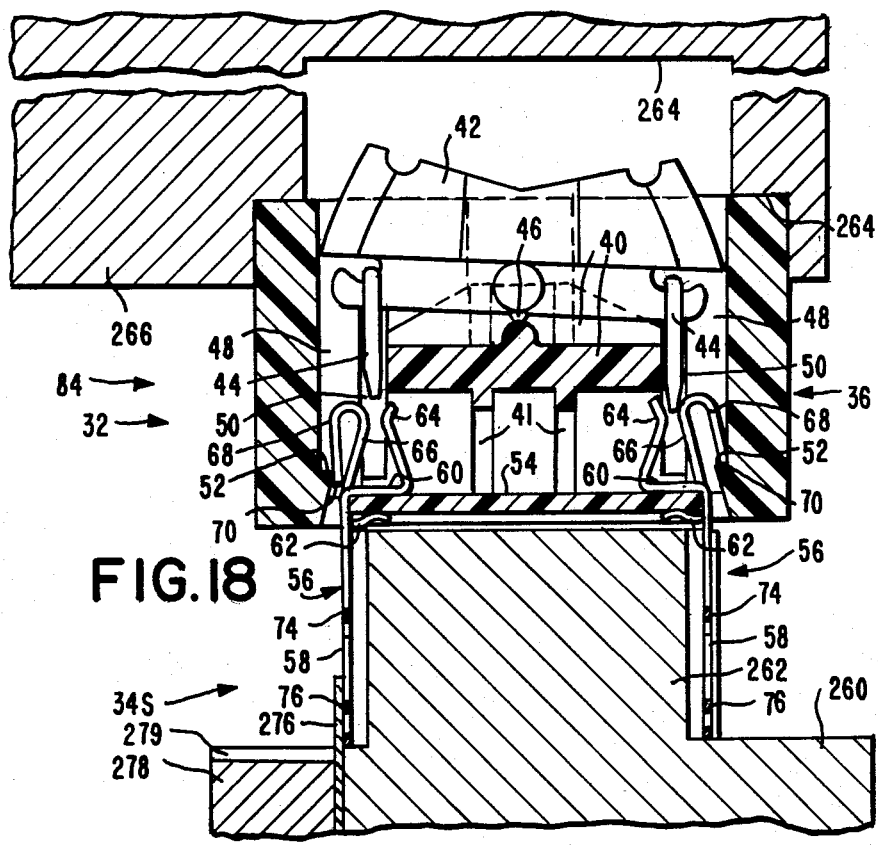
FIG. 18 is a cross-sectional view similar to FIG. 17 showing the lead-seating station in an intermediate position.
Figure 19:
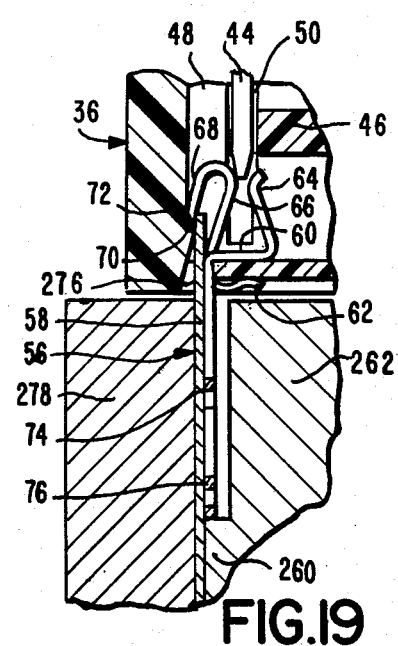
FIG. 19 is a partial cross-sectional view showing a portion of the lead-seating station shown in FIGS. 16, 17 and 18, in a final lead-seating position.

After the housing-substrate-lead assembly 32, 34S has been indexed into the lead-seating station 84 as shown in FIGS. 16 and 17, the air cylinder 268 (FIG. 16) is energized to shift the guide block 266, and thus the assembly, to the left in these figures. This shifting of the housing-substrate-lead assembly 32, 34S brings the lead support rails 76 and lower end portions of the stems 58 of the left-hand leads 56 in these figures, into firm engagement with the lead-seating blade 276, as shown in FIG. 18. The air cylinder 280 (FIG. 16) then is energized to move the lead seating blade 276 vertically upward along the stems 58 of the leads 56 into engagement with the outer ends 70 of the retaining hooks 68 of any of the leads 56 not properly seated on the adjacent inner support ledge 52 of the housing 36, to move the outer ends into seated engagement with the ledge, as shown in FIG. 19. The air cylinders 268 and 280 (FIG. 16) then are de-energized in sequence to restore the lead-seating blade 276 and the housing-substrate-lead assembly 32, 34S to their initial positions as shown in FIG. 16, for indexing of the assembly to the first connector strip shearing station 86 (FIG. 5).

CONNECTOR STRIP SHEARING STATIONS (FIG. 5)

Referring to FIG. 5, the shearing stations 86 for shearing the connector strip support rails 76 from the stems 58 of the leads 56, and shearing the connector straps 74 between the lead stems, are located sequentially on opposite sides of the path of travel of the housing-substrate-lead assemblies 32, 34S through the apparatus. The first shearing station 86 comprises essentially one-half of an elongated support block 288 secured to the base plate 98 by screws 289, with the other half of the support block forming a similar portion of the second shearing station 86. The support block 288 includes elongated upwardly projecting guide rail portions 290 for guiding and supporting the housing-substrate-lead assemblies 32, 34S as the assemblies are indexed in and out of the shearing stations 86.

Referring to the first shearing station 86 by way of example, each of the shearing stations includes an elongated die member 292 of suitable construction secured by screws 294 to the support block 288 in a slot between respective ones of the guide rail portions 290 of the block. A complementary punch-shear assembly 296 of suitable construction is secured by screws 298 to a top of a support member 300 mounted for horizontal sliding movement on projecting portions of guide shafts 302 fixedly mounted in the elongated support block 288. A bifurcated portion of the support member 300 is connected by a pivot pin 304 and a link member 306 to a pivot pin 308 extending through upstanding legs of a U-shaped member 310 mounted on an upper end of a piston rod (not shown) of a vertically disposed air cylinder 312. The pivot pin 308 is connected by a pair of link members 314 to a pivot pin 316 disposed in spaced lugs of a bracket 318 fixedly mounted on the base plate 98 by screws 320.

The air cylinder 312 is essentially disposed below the level of the base plate 98 and has a lower end pivotally mounted in a suitable manner (not shown) on a bottom plate 322 of an essentially rectangular frame assembly 324 disposed in an opening in the base plate and having flange portions thereof secured to the base plate by screws 326. Thus, when the air cylinder 312 is operated, the support block 300, and the punch-shear assembly 296 mounted thereon, is advanced to sever stem interconnecting straps 74 and the support rail 76 from the adjacent leads 56 in a known manner. As a result, the shearing stations 86 cooperate in sequence to remove the stem interconnecting straps 74 and the support rails 76 from the substrate-lead subsassembly 34S to form the completed attenuator assembly 30 as shown in FIGS. 1 and 2, which then is indexed to the magazine loading station 90.

MAGAZINE LOADING STATION (FIGS. 6 and 20-26)

Referring to FIG. 6, in the magazine loading station 90 each of the attenuator assemblies 30 is indexed into the station onto a guide rail section 328. The guide rail section 328 is mounted for oscillating movement through a 90 degree arc between a solid line position for receiving one of the attenuator assemblies 30 thereon, and a broken line position for loading of the assembly into one of the tubular magazines 88.

The guide rail section 328 is integrally formed with a cylindrical lower hub 330 mounted for rotatable adjustment by a set screw (not shown) on an upper end of a vertical support shaft 332 of a small rotary air cylinder (not shown) of a known type disposed in an opening in the main base plate 98 and having a mounting flange 334 secured to the base plate by screws 336. The loading of the attenuator assembly 30 into the tubular magazine 88 from the guide rail section 328 is accomplished by an air cylinder 338 mounted on the main base plate 98 and having a plastic pusher member 340 mounted on a piston rod of the air cylinder and engageable with the assembly when the air cylinder is energized.

Figure 20:
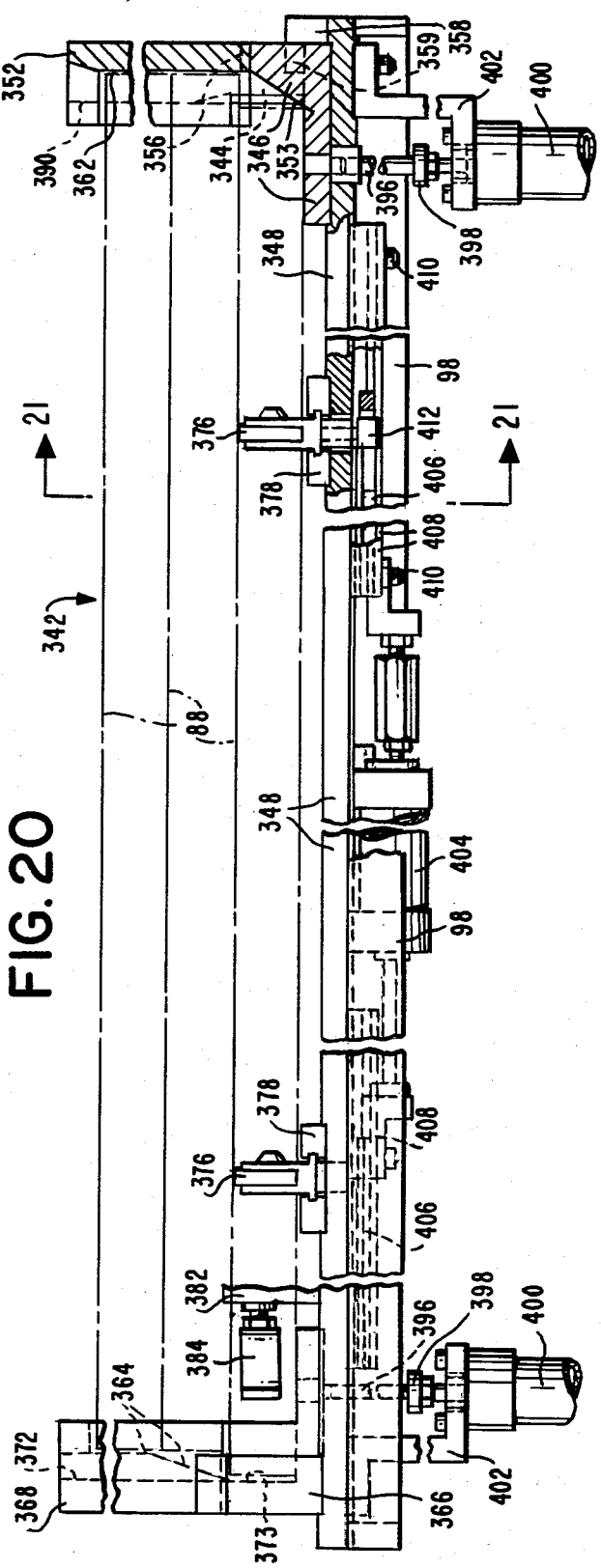
FIG. 20 is an elevational view of a magazine loading station of the apparatus, taken along the line 20—20 in FIG. 6.

The loading of the attenuator assemblies 30 into one of the tubular magazines 88 in the magazine loading station 90 is accomplished with the magazine located in a loading position 341 (FIG. 6) in a magazine feeding mechanism 342 (FIGS. 6 and 20). In this connection, the right-hand end of the tubular magazine 88, as viewed in FIGS. 6 and 20, is received in a socket 344 defined in part by a U-shaped passageway in a raised pedestal portion of a lower guide block 346 (best shown in FIG. 20) mounted on a secondary base plate 348 by screws 350 (FIG. 6). A top of the socket 344 is defined by a lower surface of a vertically disposed upper guide block 352 having lower side lugs secured to the raised pedestal portion of the lower guide block 346 by screws 354 (FIG. 6). The socket 344 is generally aligned with a guideway 356 defined by surfaces of the lower and upper guide blocks 346 and 352, for guiding the attenuator assemblies 30 into the tubular magazine 88. An upwardly projecting guide rail section 358 is aligned with an upstanding center guide section 359 of the lower guide block 346 in the guideway 356 and is secured to the secondary base plate 348. The secondary base plate 348 is secured to the apparatus main base plate 98 over a rectangular opening in the main base plate by screws 360 (FIG. 6).

Referring to FIGS. 6, 20 and 21, the tubular magazine 88 in the magazine loading position 341 is fed thereto from a lower end of a stack of empty magazines in the magazine feeding mechanism 342. In this connection, referring to FIGS. 6 and 20, right-hand ends of the empty magazines 88, as viewed in these figures, are disposed in an upper portion of a vertical guide slot 362 defined by the lower and upper guide blocks 346 and 352. The lower guide block 346 also includes an inclined cam surface 353 for camming a descending magazine to the left in FIGS. 6 and 20, out of the lower portion of the vertical guide slot 362, for subsequent transfer to the magazine loading position 341.

The left-hand ends of the empty magazines 88, as viewed in FIGS. 6 and 20, are disposed in an upper portion of a vertical guide slot 364 defined by second lower and upper guide blocks 366 and 368. As in the case of the first guide blocks 346 and 352, lower side lugs on the second upper guide block 366 are secured by screws 370 (FIG. 6) to an upstanding pedestal portion of the second lower guide block, and the lower guide block is secured to the secondary base plate 348 by screws 371. A lower portion of the vertical guide slot 364 and a lower portion of another vertical guide slot 372, which is defined by the second guide blocks 366 and 368, are interconnected by a passageway 373 to permit the above-described transfer of one of the empty magazines 88 into alignment with the magazine loading position 341.

Prior to the feeding of one of the empty tubular magazines 88 into the magazine loading position 341 as shown in FIG. 6, a bottom one of the empty tubular magazines also is disposed in slots 374 formed in respective ones of a pair of horizontally spaced first and second shuttles 376 (FIG. 6), as illustrated in FIG. 21. The shuttles 376 are slidably mounted for reciprocable movement in guide plates 378 (FIGS. 6, 20 and 21) secured to the secondary base plate 348 by screws 380 (FIG. 6). When the shuttles 376 are shifted to the left, as viewed in FIG. 21, the bottom magazine 88 is moved by the shuttles into alignment with the magazine loading position 341, as shown in FIG. 22. At the same time, upper edges of the shuttles 376 preclude downward movement of the stack of empty magazines 88 in their guide slots 362 and 364 (FIGS. 6 and 20) in the upper guide blocks 352 and 368, respectively. After the bottom magazine 88 has been aligned with the loading position 341, an air cylinder 382 (FIGS. 6 and 20), which is mounted on the secondary base plate 348, is energized to cause a finger 384 on a piston rod of the air cylinder to push the magazine to the right in FIGS. 6 and 20, to seat the magazine in the socket 344.

After the magazine 88 in the loading position has been filled with the attenuator assemblies 30, as determined by a photoelectric detector (not shown), the air cylinder 382 is de-energized and another air cylinder 386 (FIG. 6), which also is mounted on the secondary base plate 348, is energized. The energized air cylinder 386 moves a retracting finger 388 (FIG. 6), which extends into a slot (not shown) in the lower guide block 346, to the left in FIG. 6 to pull the adjacent end of the loaded magazine 88 from the socket 344 and to locate the adjacent end below a vertical guide slot 390 (FIG. 6) defined by aligned vertical ribs on the first upper guide block 352. At the same time, the opposite end of the loaded magazine 88 is moved into the lower portion of the vertical guide slot 372 defined by the second guide blocks 366 and 368.

Referring to FIGS. 6, 20 and 23, the loaded magazine 88 next is raised vertically by a first set of lift pins 394 being moved upward through apertures in the secondary base plate 348 and the lower guide blocks 346 and 366 (FIGS. 6 and 20) into engagement with the bottom of the magazine. At the same time, a second set of lift pins 396 is moved upward through apertures in the secondary base plate 348 and the lower guide blocks 346 and 366 into engagement with the next bottom magazine 88 in the stack of empty magazines. In this connection, a lower end of each of the lift pins 394 and 396 is mounted on a respective end of respective one of a pair of horizontal bar members 398 (FIGS. 20 and 23). Each of the bar members 398 is mounted at its center on an upper end of a piston rod of a respective air cylinder 400 (FIG. 20) mounted beneath the secondary base plate 348 by a bracket 402 (FIG. 20).

Referring to FIG. 24, the shuttles 376 next are shifted back to the right in this figure, to again locate the slots 374 therein below the stack of empty magazines 88. The air cylinders 400 then are de-energized to lower the lift pins 394 and 396, with the bottom one of the empty magazines being lowered by the lift pins 396 into the slots 374 in the shuttles 376, as shown in FIG. 25. The just-loaded magazine 88, however, is now retained in its elevated position in the vertical slots 372 and 390 (FIGS. 6 and 20) by the upper edges of the shuttles 376. As the bottom empty magazine 88 descends, the sloping cam surface 353 (right-hand side of FIGS. 6 and 20) on the first lower guide block 346 causes the magazine to shift to the left out of the lower end of the vertical guide slot 362, as above described, for subsequent transfer horizontally into alignment with the magazine loading position 341.

Referring to FIG. 26, the shuttles 376 now are again shifted to the left in this figure to move the next bottom empty magazine 88 into alignment with the magazine loading position 341 beneath the previously loaded magazine. The empty magazine 88 then is moved into the socket 344 (FIGS. 6 and 20) defined by the first guide blocks 346 and 352, by the air cylinder 382 and the advancing finger 384 as above described, for loading of the attenuator assemblies 30 into the magazine.

Referring to FIG. 20, reciprocation of the shuttles 376 is accomplished by a dual air cylinder 404 mounted on the bottom of the secondary base plate 348 in a suitable manner. The dual air cylinder 404 has piston rods extending from its opposite ends, and a horizontally disposed camming plate 406 is suitably mounted on an outer end of each piston rod. Opposite edges of each camming plate 406 are supported for horizontal sliding movement in suitable guideways defined by opposed inwardly directed flanges of elongated guide rail members 408 secured to the bottom of the secondary base plate 348 by screws 410. Referring to the right-hand side of FIG. 20, each camming plate 406 has a cam track which receives a cam roller 412 rotatably mounted on the associated shuttle 376 such that as operation of the dual air cylinder 404 causes reciprocation of the camming plates horizontally in FIG. 20, the shuttles are reciprocated perpendicularly (into and out of the paper in FIG. 20) to the direction of the reciprocation of the camming plates.

INDEXING MECHANISM (FIGS. 4, 5 and 6)

Referring to FIGS. 4, 5 and 6, the indexing mechanism 92 for indexing the housing-substrate-lead assemblies 32, 34S between the processing stations 80, 82, 84, 86 and 90 of the apparatus includes an elongated indexing bar 414 having a plurality of spaced indexing fingers 416 projecting from one edge thereof. The spacings between the indexing fingers 416 is slightly larger than the length of the housings 36 of the assemblies 32, 34S so that the housings can be received between adjacent ones of the fingers. The indexing bar 414 is movable in a rectangular path in an indexing cycle, namely, vertically upward as viewed in FIGS. 4, 5 and 6 to advance the assemblies 32, 34S through the apparatus one increment, to the right in these figures to disengage from the assemblies, vertically downward as viewed in these figures one increment, and then to the left in these figures to re-engage the assemblies for the next indexing cycle. During the indexing of the assemblies 32, 34S through the apparatus, the assemblies are guided between the processing stations 82, 84, 86 and 90 by the assemblies straddling elongated guide rails 418 suitably supported on the main base plate 98.

More specifically, referring to FIG. 5, the indexing bar 414 is secured by screws 420 to an X-slide 422 of an X, Y slide assembly 424 of any suitable type and the details of which are not shown. In this regard, the X-slide 422 is supported for reciprocating movement on a Y-slide 426 of the X, Y slide assembly 424 in a known manner, on guide shafts 428 fixedly mounted on an upwardly projecting portion (not shown) of the Y-slide. The Y-slide 426 includes a reciprocable member of a ball bearing-type slide mechanism having a fixed support block (not shown) suitably mounted on the main base plate 98.

The X-slide 422 is reciprocated by an air cylinder 430 mounted on a bracket portion of the Y-slide 426 as shown in FIG. 5, and the Y-slide is reciprocated by an air cylinder 432 suitably mounted on the main base plate 98 as shown in FIG. 4. The air cylinders 430 and 432 are operated in sequence in a known manner to produce the rectangular path movement of the indexing bar 414 as above described. The amount of reciprocating travel of the indexing bar 414 is controlled by suitable adjustable screw threaded stops 434 (one shown in FIG. 5) engageable by the Y-slide 426 and mounted on the main base plate 98.

Operation of the indexing mechanism 92 and of the mechanisms of the various processing stations 80, 82, 84, 86, and 90 as the indexing mechanism indexes the assemblies 32, 34S between the stations, may be controlled in any suitable manner, such as by a Model #5T1-5201 time sequencer (not shown) available from Texas Instruments, Incorporated of Dallas, Texas. To insure that the indexing mechanism 92 has properly indexed the assemblies 32, 34S between the processing stations 80, 82, 84, 86 and 90, a suitable safety switch (not shown), which is operated by the indexing mechanism 92 each time the indexing mechanism properly completes its forward advance, to reset the time sequencer for another cycle of operation, also may be provided. Other safety switches (not shown) and/or limit switches (not shown) to control the indexing mechanism 92 and/or the other mechanisms of the apparatus described herein also may be provided as desired, in a known manner.

SUMMARY

In summary, new and improved methods and apparatus have been disclosed for assembling an article, such as the substrate-lead subassembly 34S (FIG. 3), into a housing, such as the housing 36 of the housing subassembly 32 (FIGS. 1 and 2), wherein the article includes portions (e.g., the lead-retaining hooks 68) which are readily susceptible to damage and which project outward beyond edges of an opening (e.g., opening 38) in the housing for receiving the article. More specifically, in the initial assembling station 80 (FIGS. 4 and 8-12), referring to FIG. 8, as the housing subassembly 32 is transferred horizontally by the slide mechanism 172 into the initial assembling position 149 above the substrate-lead subassembly 34S, movement of the clamping plate 182 of the slide mechanism is interrupted by the cam block 202 engaging the adjacent end of the slide assembly top plate member 140. As the clamping plate 178 then continues to move with the slide mechanism 172, as shown in FIG. 9, since the left-hand lower edge of the housing 36 (as viewed in FIG. 9) is temporarily supported on the inclined support ledge 188 of the clamping plate 182, the housing subassembly 32 begins to tip clockwise by gravity until the inner bottom edge 223 of the housing engages on top of the adjacent lead-retaining hooks 68.

Referring to FIG. 10, during a final increment of movement of the clamping plate 178, the housing subassembly 32 slides downward to the right in this figure, with tipping of the housing 36 being controlled by the housing upper edge 225 sliding down the vertical surface 180 of the clamping plate. During this sliding movement of the housing 36, the lower edge 224 of the housing slides down the inclined support ledge 188 of the clamping plate 182, and then slides down the adjacent vertical surface 189 of the clamping plate, as shown in FIG. 11, as the housing subassembly 32 begins to drop essentially vertically by gravity.

Referrring to FIG. 12, the housing subassembly 32 continues to drop vertically by gravity until the right-hand housing inner support ledge 52, as viewed in this figure, is slightly below the retaining hook outer ends 70 of the adjacent leads 56, as shown in broken lines, with portions of the leads received in the housing. At substantially the same time the housing inner edge 226 on the opposite side of the housing 36 engages on the adjacent lead-retaining hooks 68, and slides a short distance down outer surfaces of these hooks to cause the housing to shift to the left in FIG. 12, bringing the right-hand housing inner support ledge 52 into interlocking engagement with the adjacent lead-retaining hook outer ends 70.

Assembling of the substrate-lead subassembly 34S into the housing 36 is essentially completed in the subassembly-seating station 82 (FIGS. 4 and 13-15), with portions of the left-hand leads 56, as viewed in FIG. 14, becoming received in the housing 36 as shown in that figure. Any of the lead-retaining hooks 68 which do not seat properly on the left-hand inner support ledge 52 of the housing 36, as viewed in FIG. 14, subsequently are properly seated by the seating blade 276 in the lead-seating station 84 (FIGS. 5 and 16-19). The lead-interconnecting support straps 74 (FIG. 3) and the lead support rails 76 (FIG. 3) then are severed from the leads 56 on both sides of the subassembly 34S in the connector strip shearing stations 86 (FIG. 5) to form the completed attenuator assembly 30 shown in FIGS. 1 and 2. The attenuator assembly 30 subsequently is fed into one of the tubular magazines 88 in the magazine loading station 90 (FIGS. 6 and 20-26), which includes the magazine feeding mechanism 342 for automatically feeding the magazines into and out of the loading position 341.

What is claimed is:

1. A method of assembling an article into a housing in which portions of the article on first and second opposite sides of the article project outward beyond edges of an opening in the housing for receiving the article, which comprises the steps of:
    supporting the article in an assembling position;
    supporting the housing above the article with the opening in the housing essentially aligned with the article;
    releasing a first side of the housing so that the first side of the housing tips downward by gravity to receive the projecting portions on the first side of the article into the opening in the housing; and
    then releasing a second opposite side of the housing so that the second side of the housing drops downward by gravity to receive the projecting portions on the second side of the article into the opening in the housing.

2. The method as recited in claim 1, which further comprises the steps of:
    temporarily supporting a lower edge of the second side of the housing to cause the housing to tip when the first side of the housing is released; and
    continuing to engage an upper edge of the first side of the housing after the first side of the housing has been released, to control the degree of tipping of the housing.

3. The method as recited in claim 1, in which:
    the housing is supported above the article by clamping the first and second opposite sides of the housing; and
    the first side of the housing is released by moving an associated clamping member away from the first side of the housing.

4. The method as recited in claim 1, which further comprises the steps of:
    feeding the housing into a transfer mechanism; and
    moving the transfer mechanism to move the housing into position above the article.

5. The method as recited in claim 4, in which:
    the transfer mechanism is moved horizontally to position the housing above the article.

6. The method as recited in claim 1, which further comprises the step of:
    releasing the second side of the housing onto the projecting portions on the second side of the article such that the housing shifts laterally to cause inner recessed portions of the housing to move into interlocking engagement ith outer ends of the projecting portions on the first side of the article.

7. The method as recited in claim 6, which further comprises the step of:
    moving outer ends of the projecting portions on the second side of the article into interlocking engagement with inner recessed portions of the housing after the projecting portions on the second side of the article have been received in the opening in the housing.

8. The method as recited in claim 7, in which the housing includes operating members mounted within the housing adjacent the opposite sides of the housing and movable between advanced positions adjacent the opening in the housing and retracted positions within the housing, which further comprises the step of:
    moving the operating members out of their advanced positions for the reception of the projecting portions of the article into the opening in the housing and the engagement of the outer ends of the projecting portions with the inner recessed portions of the housing.

9. The method as recited in claim 7, in which the projecting portions on each side of the article form parts of respective members interconnected to one another by connecting strips, and whcch further comprises the step of:
    severing the connecting strips from the members after the outer ends of the projecting portions of the members have been engaged with the inner recessed portions of the housing.

10. The method as recited in claim 7, which further comprises the step of:
    feeding the assembled article and housing into a magazine after the article has been assembled into the housing.

11. The method as recited in claim 10, which further comprises the steps of:
    transferring the magazine horizontally from the bottom of a stack of empty magazines to a loading position for feeding of assembled articles and housings into the magazine;
    retaining the stack of empty magazines against downward vertical movement as the magazine is transferred horizontally into the loading position;
    raising the magazine vertically to an elevated level after the magazine has been filled with assembled articles and housings;
    retaining the filled magazine at the elevated level;
    lowering the stack of empty magazines; and
    transferring the next empty magazine horizontally from the bottom of the stack of empty magazines into the loading position below the filled magazine.

12. A method of feeding articles into magazines, which comprises the steps of:
    providing an article guide means in an article feeding position;
    providing a stack of empty elongated, horizontally disposed magazines adjacent the article feeding position;

transferring a lowermost empty magazine in the stack of empty magazines horizontally in a first direction into a position in alignment with the article guide means;

retaining the stack of empty magazines against downward vertical movement as the lowermost magazine in the stack is transferred horizontally into alignment with the article guide means;

causing relative horizontal movement between the transferred empty magazine and the article guide means in a second direction to seat one end of the magazine against the article guide means;

feeding articles through the article guide means and the one end of the seated empty magazine, to fill the magazine with articles;

causing relative horizontal movement between the filled magazine and the article guide means to separate the one end of the filled magazine from the article guide means;

raising the filled magazine vertically to an elevated level after the one end of the magazine has been separated from the article guide means;

retaining the filled magazine at the elevated level;

lowering the stack of empty elongated magazines; and transferring the next lowermost empty magazine in the stack of empty magazines horizontally in the first direction into the position in alignment with the article guide means and below the elevated filled magazine.

13. Apparatus for assembling an article into a housing in which portions of the article on opposite first and second sides of the article project outward beyond edges of an opening in the housing for receiving the article, which comprises:

a main base plate;

article support means mounted on the main base plate for supporting the article in an assembling position;

housing support means mounted on the main base plate for supporting the housing above the article in the assembling position with the opening in the housing essentially aligned with the article, the housing support means including first and second releasable means for supporting first and second opposite sides of the housing, respectively; and means attached to the housing support means for causing the first and second releasable means to release their respective first and second opposite sides of the housing in sequence such that the first side of the housing initially tips downward by gravity to receive the projecting portions on the first side of the article into the opening in the housing, and such that the second side of the housing then drops downward by gravity to receive the projecting portions on the second side of the article in the opening in the housing.

14. Apparatus as recited in claim 13, in which:

the first and second releasable means are opposed first and second clamping means for clamping the opposite first and second sides of the housing, respectively.

15. Apparatus as recited in claim 13, in which the housing support means is movable relative to the article support means, and which further comprises:

movable means mounted on the main base plate for moving the housing support means between an advanced assembling position above the article support means and a retracted position;

movable means mounted on the main base plate for feeding the housing into the housing support means in the retracted position; and guide means mounted on the main base plate for guiding the movable housing support means for movement between the advanced and retracted positions.

16. Apparatus as recited in claim 15, in which:

the moving means moves the housing support means horizontally between the advanced and retracted positions.

17. Apparatus as recited in claim 15, in which:

the first releasable means is a fixed clamping means for engaging and clamping the first side of the housing;

the second releasable means is a spring-biased clamping means for engaging and clamping the second side of the housing and urging the housing against the fixed clamping means, the spring-biased clamping means being movable relative to the fixed clamping means; and the means for causing the first and second releasable means to release the first and second sides of the housing in sequence includes means for interrupting movement of the spring-biased clamping means as the housing support means is moved into the advanced assembling position, such that continued movement of the housing support means and the fixed clamping means causes the fixed clamping means to disengage from and to release the first side of the housing.

18. Apparatus as recited in claim 17, in which:

the fixed clamping means includes a planar vertical clamping surface engageable with the first side of the housing; and the spring-biased clamping means includes a planar vertical clamping surface engageable with the second side of the housing, and further includes an inclined control surface at a lower end of the vertical clamping surface, for supporting a lower adjacent edge of the housing.

19. Apparatus as recited in claim 13, in which outer ends of the projecting portions on the first and second sides of the article seat upon respective inner recessed portions of the housing when the article is assembled in the housing, and which further comprises:

a lead-seating station mounted on the main base plate; and movable blade means located in the lead-seating station for moving any unseated outer ends of at least the projecting portions on the second side of the article into seated interlocking engagement with the respective inner recessed portions of the housing after the projecting portions have been received in the opening in the housing.

20. Apparatus as recited in claim 19, in which the housing includes operating members mounted within the housing adjacent the opposite sides of the housing and movable between advanced positions adjacent the opening in the housing and retracted positions within the housing, and which further comprises:

movable means mounted on the main base plate for moving the operating members out of their advanced positions for the reception of the projecting portions of the article into the opening in the housing and the moving of the outer ends of the projecting portions into seated engagement with the inner recessed portions of the housing.

21. Apparatus as recited in claim 19, in which the projecting portions on each side of the article forms parts of respective members interconnected to one another by a connecting strip, and which further comprises:
- a shearing station mounted on the main base plate proximate the lead-seating station; and
- means located in the shearing station for severing the connecting strips from the members after the outer ends of the projecting portions of the members have been engaged with the inner recessed portions of the housing.

22. Apparatus as recited in claim 19, which further comprises:
- movable means mounted on the main base plate for feeding the assembled article and housing into a magazine after the article has been assembled into the housing; and
- indexing means mounted on the main base plate for indexing the assembled article and housing from the lead-seating station into alignment with the magazine and the feeding means.

23. Apparatus as recited in claim 22, which further comprises:
- assembly guide means mounted on the main base plate for guiding the assembled article and housing into the magazine;
- transfer means movably associated with the assembly guide means for transferring the magazine horizontally from the bottom of a stack of empty magazines into a feeding position in which the magazine is aligned with the assembly guide means and in which the feeding means feeds assembled articles and housings through the assembly guide means into the magazine;
- means operatively associated with the transfer means for retaining the stack of empty magazines against downward vertical movement as the magazine is transferred horizontally into the feeding position by the transfer means;
- movable means mounted on the main base plate for raising the magazine vertically to an elevated level after the magazine has been filled with assembled articles and housings by the feeding means;
- means operatively associated with the transfer means for retaining the filled magazine at the elevated level; and
- movable means mounted on the main base plate for lowering the stack of empty magazines to locate the next empty magazine which is at the bottom of the stack of empty magazines in position for transfer by the magazine feed means into the feeding position below the filled magazine.

24. Apparatus for feeding articles into magazines, which comprises:
- a main base plate;
- guide means mounted on the main base plate for guiding articles into a magazine in an article feeding position;
- means mounted on the main base plate for holding a stack of empty elongated, horizontally disposed magazines adjacent the article feeding position;
- transfer means movably associated with the magazine holding means for transferring a lowermost empty magazine in the stack of empty magazines horizontally in a first direction into a position in alignment with the article guide means;
- means operatively associated with the transfer means for retaining the stack of empty magazines against downward vertical movement as the lowermost magazine in the stack is transferred horizontally into alignment with the article guide means by the transfer means;
- movable means operatively associated with the transfer means for causing relative horizontal movement between the transferred empty magazine and the article guide means in a second direction to seat one end of the magazine against the article guide means;
- movable means mounted on the main base plate for feeding articles through the article guide means and the one end of the seated empty magazine, to fill the magazine with articles;
- movable means operatively associated with transfer means for causing relative horizontal movement between the filled magazine and the article guide means to separate the one end of the filled magazine from the article guide means;
- movable means mounted on the main base plate for raising the filled magazine vertically to an elevated level after the one end of the magazine has been separated from the article guide means;
- means operatively associated with the transfer means for retaining the filled magazine at the elevated level; and
- movable means mounted on the main base plate for lowering the stack of empty elongated magazines to locate the next empty magazine which is at the bottom of the stack of empty magazines in position for transfer by the magazine transfer means horizontally in the first direction into the position in alignment with the article guide means and below the filled magazine.

25. Apparatus for feeding articles into magazines, as recited in claim 24, in which:
- the magazine transfer means includes a pair of spaced reciprocating shuttle members each having an upwardly-opening slot therein for receiving one of the magazines in the slot, each of the reciprocating shuttle members also having first and second upper horizontal edges on opposite sides of the slot in the shuttle member with the first and second upper horizontal edges of the shuttle members defining a part of the retaining means for the stack of empty magazines and a part of the retaining means for the filled magazine, respectively.

26. Apparatus for feeding articles into magazines, as recited in claim 25, in which:
- the raising means for the filled magazine includes first vertically movable pin means for engaging and lifting the magazine out of the slots in the reciprocating shuttle members; and
- the lowering means for the stack of empty magazines includes second vertically movable pin means which lowers each lowermost magazine in the stack of empty magazines into the slots in the reciprocating shuttle members.

27. Apparatus for feeding articles into magazines, as recited in claim 26, which further comprises:
- means for supporting the first and second vertically movable pin means for vertical movement as a unit; and
- means for raising and lowering the support means to raise and lower the first and second vertically movable pin means.

* * * * *